United States Patent
Deshmukh et al.

(10) Patent No.: US 9,256,646 B2
(45) Date of Patent: Feb. 9, 2016

(54) CONFIGURABLE DATA WINDOWS FOR ARCHIVED RELATIONS

(71) Applicant: Oracle International Corporation, Redwood Shores, CA (US)

(72) Inventors: Unmesh Anil Deshmukh, Nagpur (IN); Anand Srinivasan, Bangalore (IN); Sandeep Bishnoi, Sirsa (IN)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 13/830,129

(22) Filed: Mar. 14, 2013

(65) Prior Publication Data

US 2014/0095529 A1    Apr. 3, 2014

Related U.S. Application Data

(60) Provisional application No. 61/707,641, filed on Sep. 28, 2012.

(51) Int. Cl.
*G06F 17/30* (2006.01)

(52) U.S. Cl.
CPC .... *G06F 17/30483* (2013.01); *G06F 17/30389* (2013.01); *G06F 17/30424* (2013.01); *G06F 17/30442* (2013.01); *G06F 17/30451* (2013.01); *G06F 17/30457* (2013.01); *G06F 17/30477* (2013.01); *G06F 17/30516* (2013.01); *G06F 17/30548* (2013.01); *G06F 17/30551* (2013.01); *G06F 17/30864* (2013.01)

(58) Field of Classification Search
CPC .................................................. G06F 17/30516
See application file for complete search history.

(56) References Cited

U.S. PATENT DOCUMENTS

| | | |
|---|---|---|
| 4,996,687 A | 2/1991 | Hess et al. |
| 5,051,947 A | 9/1991 | Messenger et al. |
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De |

(Continued)

FOREIGN PATENT DOCUMENTS

| | | |
|---|---|---|
| EP | 1 241 589 A2 | 9/2002 |
| EP | 2474922 | 7/2012 |

(Continued)

OTHER PUBLICATIONS

Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.

(Continued)

*Primary Examiner* — Rehana Perveen
*Assistant Examiner* — Alexander Khong
(74) *Attorney, Agent, or Firm* — Kilpatrick Townsend & Stockton LLP

(57) ABSTRACT

Techniques for managing configurable data windows for streams and/or archived relations are provided. In some examples, a query that identifies at least a data stream or an archived relation may be identified. Additionally, a configurable window size may be identified. In some instances, the query may be initialized with at least a portion of the historical data based at least in part on the window size. Further, the query may be evaluated based at least in part on the data stream and the portion of the historical data.

20 Claims, 19 Drawing Sheets

(56) References Cited

U.S. PATENT DOCUMENTS

| | | |
|---|---|---|
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sakar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,122,006 B2 | 2/2012 | De Castro et al. |
| 8,134,184 B2 | 3/2012 | Becker et al. |
| 8,145,859 B2 | 3/2012 | Park et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,744 B2 | 5/2013 | De Castro Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |

(56) References Cited

U.S. PATENT DOCUMENTS

| | | |
|---|---|---|
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |
| 8,745,070 B2 | 6/2014 | Krisnamurthy |
| 8,762,369 B2 | 6/2014 | Macho et al. |
| 8,775,412 B2 | 7/2014 | Day et al. |
| 9,047,249 B2 | 6/2015 | de Castro Alves et al. |
| 2002/0023211 A1 | 2/2002 | Roth et al. |
| 2002/0032804 A1 | 3/2002 | Hunt |
| 2002/0038313 A1 | 3/2002 | Klein et al. |
| 2002/0049788 A1 | 4/2002 | Lipkin |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167704 A1 | 7/2006 | Nicholls et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | Mcgoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | Mcwilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1* | 3/2009 | Alves et al. .............. 719/318 |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |

(56) References Cited

U.S. PATENT DOCUMENTS

| | | |
|---|---|---|
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0106853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106946 A1 | 4/2010 | Imaki et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1* | 1/2011 | Zhang et al. .................. 707/805 |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0105857 A1 | 5/2011 | Zhang et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1* | 5/2013 | Wolf .............................. 707/792 |
| 2013/0144866 A1 | 6/2013 | Jerzak et al. |
| 2013/0191370 A1* | 7/2013 | Chen et al. ..................... 707/718 |
| 2013/0332240 A1 | 12/2013 | Patri et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0358959 A1 | 12/2014 | Bishnoi et al. |
| 2014/0379712 A1* | 12/2014 | Lafuente Alvarez ......... 707/736 |
| 2015/0156241 A1 | 6/2015 | Shukla et al. |
| 2015/0161214 A1 | 6/2015 | Kali et al. |

FOREIGN PATENT DOCUMENTS

| | | |
|---|---|---|
| WO | 00/49533 A2 | 8/2000 |
| WO | WO00/49533 | 8/2000 |
| WO | 0118712 | 5/2001 |
| WO | 01/59602 A1 | 8/2001 |
| WO | 01/65418 A1 | 9/2001 |
| WO | 03/030031 A2 | 4/2003 |
| WO | 2007122347 | 11/2007 |
| WO | 2012/037511 A1 | 3/2012 |
| WO | 2012050582 | 4/2012 |

(56) References Cited

FOREIGN PATENT DOCUMENTS

WO     2012/154408 A1    11/2012
WO     2012/158360 A1    11/2012

OTHER PUBLICATIONS

Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
U.S. Appl. No. 12/548,187, Non-Final Office Action mailed on Feb. 6, 2014, 54 pages.
U.S. Appl. No. 12/548,281, Non-Final Office Action mailed on Feb. 13, 2014, 16 pages.
U.S. Appl. No. 13/177,748, Final Office Action mailed on Mar. 20, 2014, 23 pages.
PCT Patent Application No. PCT/US2014/010832, International Search Report mailed on Apr. 3, 2014, 9 pages.
Agrawal et al., Efficient pattern matching over event streams, Proceedings of the 2008 ACM SIGMOD international conference on Management of data, Jun. 9-12, 2008, pp. 147-160.
Cadonna et al., Efficient event pattern matching with match windows, Proceedings of the 18$^{th}$ ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
Oracle Application Server, Enterprise Deployment Guide, 10g Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.
Stream Query Repository: Online Auctions, at URL: http://www-db.stanford.edu/stream/sqr/onauc.html#queryspecsend, Dec. 2, 2002, 2 pages.
Esper Reference Documentation, Copyright 2008, ver. 2.0.0, 2008, 202 pages.
Oracle Database Data Cartridge Developer's Guide, B28425-03, 11 g Release 1 (11.1), Oracle, Mar. 2008, 372 pages.
Oracle Application Server, Administrator's Guide, 10g Release 3 (10.1.3.2.0), B32196-01, Oracle, Jan. 2007, 376 pages.
Oracle Application Server 10g, Release 2 and 3, New Features Overview, An Oracle White Paper, Oracle., Oct. 2005, 48 pages.

Oracle Database, SQL Reference, 10g Release 1 (10.1), Part No. B10759-01, Dec. 2003, pp. 7-1 to 7-17; 7-287 to 7-290; 14-61 to 14-74.
Complex Event Processing in the Real World, An Oracle White Paper., Sep. 2007, 13 pages.
Coral8 Complex Event Processing Technology Overview, Coral8, Inc., Make it Continuous, Copyright 2007 Coral8, Inc., 2007, pp. 1-8.
Creating WebLogic Domains Using the Configuration Wizard, BEA Products, Version 10.0, Dec. 2007, 78 pages.
Creating Weblogic Event Server Applications, BEA WebLogic Event Server, Version 2.0, Jul. 2007, 90 pages.
Dependency Injection, Wikipedia, printed on Apr. 29, 2011, at URL: D http:en.wikipedia.org/w/index.php? title=DependencLinjection &0ldid=260831402,, Dec. 30, 2008, pp. 1-7.
Deploying Applications to WebLogic Server, BEA WebLogic Server, ver. D 10.0, Mar. 30, 2007, 164 pages.
Developing Applications with Weblogic Server, BEA WebLogic Server, ver. D 10.0, Mar. 30, 2007, 254 pages.
EPL Reference, BEA WebLogic Event Server, ver. 2.0, Jul. 2007, 82 pages.
Esper Reference Documentation Version 3.1.0, EsperTech, retrieved from internet at URL:http://esper.codehaus.org/esper-3.1.0/doc/reference/en/pdf/esper_reference.pdf, 2009, 293 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs1 OO/quickstart/quick_start. html, May 10, 2010, 1page.
Getting Started with WebLogic Event Server, BEA WebLogic Event Serverver 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, BEA WebLogic Real Time, , ver. 2.0,, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Managing Server Startup and Shutdown, BEA WebLogic Server, ver. 10.0, Mar. 30, 2007, 134 pages.
Matching Behavior, .NET Framework Developer's Guide, Microsoft Corporation, Retrieved on: Jul. 1, 2008, URL: http://msdn.microsoft.com/en-us/library/Oyzc2ybO(pri nter).aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Oracle CEP Getting Started, Release 11 gR1 (11.1.1) E14476-01, May 2009, 172 pages.
Oracle Complex Event Processing CQL Language Reference, 11g Release 1 (11.1.1) E12048-01, Apr. 2010, 540 pages.
OSGI Service Platform Core Specification, The OSGI Alliance, OSGI Alliance, ver. 4.1, release 4, Apr. 2007, 288 pages.
Release Notes, BEA WebLogic Event Server, Ver. 2.0, Jul. 2007, 8 pages.
Spring Dynamic Modules for OSGi Service Platforms product documentation, SpringSource, D, Jan. 2008, 71 pages.
Stream Base New and Noteworthy, Stream Base, Jan. 1, 2010, 878 pages.
Stream Query Repository: Online Auctions (CQL Queries)., Retrieved from: URL: http://www-db.stanford.edu/strem/sqr/cql/onauc.html, Dec. 2, 2002, 4 pages.
Stream: The Stanford Stream Data Manager, IEEE Data Engineering Bulletin., Mar. 2003, pp. 1-8.
Stream: The Stanford Stream Data Manager, Retrieved from: URL:http://infolab.stanford.edu/stream/, Jan. 5, 2006, pp. 1-9.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.

(56) References Cited

OTHER PUBLICATIONS

WebLogic Event Server Reference, BEA WebLogic Event Server, Version. 2.0, Jul. 2007, 52 pages.
Weblogic Server Performance and Tuning, BEA WebLogic Server, Ver. 10.0, Mar. 30, 2007, 180 pages.
WebSphere Application Server V6.1 Problem Determination: IBM Redpaper Collection, WebSphere Software, IBM/Redbooks, ,., Dec. 2007, 634 pages.
U.S. Appl. No. 10/948,523, Final Office Action mailed on Jul. 6, 2007, 37 pages.
U.S. Appl. No. 10/948,523, Non-Final Office Action mailed on Dec. 11, 2007, 47 pages.
U.S. Appl. No. 10/948,523, Notice of Allowance mailed on Dec. 1, 2010, 17 pages.
U.S. Appl. No. 10/948,523, Notice of Allowance mailed on Jul. 8, 2008, 30 pages.
U.S. Appl. No. 10/948,523, Office Action mailed on Jan. 22, 2007, 31 pages.
U.S. Appl. No. 10/948,523, Supplemental Notice of Allowance mailed on Jul. 17, 2008, 17 pages.
U.S. Appl. No. 10/948,523, Supplemental Notice of Allowance mailed on Aug. 25, 2008, 3 pages.
U.S. Appl. No. 11/601,415, Advisory Action mailed on Aug. 18, 2009, 3 pages.
U.S. Appl. No. 11/601,415, Final Office Action mailed on Jul. 2, 2012.
U.S. Appl. No. 11/601,415, Final Office Action mailed on May 27, 2009, 26 pages.
U.S. Appl. No. 11/601,415, Final Office Action mailed on Jun. 30, 2010, 45 pages.
U.S. Appl. No. 11/601,415, Non-Final Office Action mailed on Sep. 17, 2008, 10 pages.
U.S. Appl. No. 11/601,415, Non-Final Office Action mailed on Nov. 30, 2009, 32 pages.
U.S. Appl. No. 11/601,415, Office Action mailed on Dec. 9, 2011.
U.S. Appl. No. 11/873,407, Final Office Action mailed on Apr. 26, 2010, 11 pages.
U.S. Appl. No. 11/873,407, Non-Final Office Action mailed on Nov. 13, 2009, 7 pages.
U.S. Appl. No. 11/873,407, Notice of Allowance mailed on Nov. 10, 2010, 14 pages.
U.S. Appl. No. 11/873,407, Notice of Allowance mailed on Mar. 7, 2011, 8 pages.
U.S. Appl. No. 11/874,197, Final Office Action mailed on Aug. 12, 2011, 26 pages.
U.S. Appl. No. 11/874,197, Final Office Action mailed on Jun. 29, 2010, 17 pages.
U.S. Appl. No. 11/874,197, Non-Final Office Action mailed on Dec. 22, 2010, 22 pages.
U.S. Appl. No. 11/874,197, Office Action mailed on Nov. 10, 2009, 14 pages.
U.S. Appl. No. 11/874,202, Final Office Action mailed on Jun. 8, 2010, 200 pages.
U.S. Appl. No. 11/874,202, Non-Final Office Action mailed on Dec. 3, 2009, 20 pages.
U.S. Appl. No. 11/874,202, Notice of Allowance mailed on Mar. 31, 2011, 12 pages.
U.S. Appl. No. 11/874,202, Notice of Allowance mailed on Dec. 22, 2010, 29 pages.
U.S. Appl. No. 11/874,850, Notice of Allowance mailed on Jan. 27, 2010, 11 pages.
U.S. Appl. No. 11/874,850, Notice of Allowance mailed on Nov. 24, 2009, 17 pages.
U.S. Appl. No. 11/874,850, Notice of Allowance mailed on Dec. 11, 2009, 5 pages.
U.S. Appl. No. 11/874,896, Final Office Action mailed on Jul. 23, 2010, 28 pages.
U.S. Appl. No. 11/874,896, Non-Final Office Action mailed on Dec. 8, 2009, 19 pages.
U.S. Appl. No. 11/874,896, Non-Final Office Action mailed on Nov. 22, 2010, 25 pages.
U.S. Appl. No. 11/874,896, Notice of Allowance mailed on Jun. 23, 2011, 30 pages.
U.S. Appl. No. 11/927,681, Non-Final Office Action mailed on Mar. 24, 2011, 17 pages.
U.S. Appl. No. 11/927,681, Notice of Allowance mailed on Jul. 1, 2011, 8 pages.
U.S. Appl. No. 11/927,683, Final Office Action mailed on Sep. 1, 2011, 18 pages.
U.S. Appl. No. 11/927,683, Non-Final Office Action mailed on Mar. 24, 2011, 13 pages.
U.S. Appl. No. 11/927,683, Notice of Allowance mailed on Nov. 9, 2011, 10 pages.
U.S. Appl. No. 11/977,437, Final Office Action mailed on Apr. 8, 2010, 18 pages.
U.S. Appl. No. 11/977,437, Non-Final Office Action mailed on Oct. 13, 2009, 9 pages.
U.S. Appl. No. 11/977,437, Notice of Allowance mailed on Mar. 4, 2013, 9 pages.
U.S. Appl. No. 11/977,437, Office Action mailed on Aug. 3, 2012.
U.S. Appl. No. 11/977,439, Non-Final Office Action mailed on Apr. 13, 2010, 7 pages.
U.S. Appl. No. 11/977,439, Notice of Allowance mailed on Mar. 16, 2011, 10 pages.
U.S. Appl. No. 11/977,439, Notice of Allowance mailed on Aug. 18, 2010, 11 pages.
U.S. Appl. No. 11/977,439, Notice of Allowance mailed on Sep. 28, 2010, 6 pages.
U.S. Appl. No. 11/977,439, Notice of Allowance mailed on Nov. 24, 2010, 8 pages.
U.S. Appl. No. 11/977,440, Notice of Allowance mailed on Oct. 7, 2009, 6 pages.
U.S. Appl. No. 12/193,377, Final Office Action mailed on Jan. 17, 2013, 24 pages.
U.S. Appl. No. 12/395,871, Non-Final Office Action mailed on May 27, 2011, 7 pages.
U.S. Appl. No. 12/395,871, Notice of Allowance mailed on May 4, 2012, 27 pages.
U.S. Appl. No. 12/395,871, Office Action mailed on Oct. 19, 2011, 33 pages.
U.S. Appl. No. 12/396,008, Non-Final Office Action mailed on Jun. 8, 2011, 10 pages.
U.S. Appl. No. 12/396,008, Notice of Allowance mailed on Nov. 16, 2011, 5 pages.
U.S. Appl. No. 12/396,464, Final Office Action mailed on Jan. 16, 2013, 17 pages.
U.S. Appl. No. 12/396,464, Non-Final Office Action mailed on Sep. 7, 2012, 18 pages.
U.S. Appl. No. 12/506,891, Notice of Allowance mailed on Jul. 25, 2012, 8 pages.
U.S. Appl. No. 12/506,891, Office Action mailed on Dec. 14, 2011, 41 pages.
U.S. Appl. No. 12/506,905, Advisory Action mailed on Nov. 6, 2012, 6 pages.
U.S. Appl. No. 12/506,905, Notice of Allowance mailed on Dec. 14, 2012, 15 pages.
U.S. Appl. No. 12/506,905, Office Action mailed on Aug. 9, 2012, 42 pages.
U.S. Appl. No. 12/506,905, Office Action mailed on Mar. 26, 2012, 86 pages.
U.S. Appl. No. 12/534,384, Notice of Allowance mailed on May 7, 2013, 12 pages.
U.S. Appl. No. 12/534,384, Office Action mailed on Feb. 28, 2012, 38 pages.
U.S. Appl. No. 12/534,384, Office Action mailed on Feb. 12, 2013, 14 pages.
U.S. Appl. No. 12/534,398, Final Office Action mailed on Jun. 6, 2012, 27 pages.
U.S. Appl. No. 12/534,398, Notice of Allowance mailed on Nov. 27, 2012, 10 pages.
U.S. Appl. No. 12/534,398, Office Action mailed on Nov. 1, 2011, 32 pages.

(56) References Cited

OTHER PUBLICATIONS

U.S. Appl. No. 12/548,187, Non Final Office Action mailed on Sep. 27, 2011, 19 pages.
U.S. Appl. No. 12/548,187, Non-Final Office Action mailed on Apr. 9, 2013, 17 pages.
U.S. Appl. No. 12/548,187, Office Action mailed on Jun. 20, 2012, 31 pages.
U.S. Appl. No. 12/548,209, Notice of Allowance mailed on Oct. 24, 2012, 22 pages.
U.S. Appl. No. 12/548,209, Office Action mailed on Apr. 16, 2012, 40 pages.
U.S. Appl. No. 12/548,222, Non-Final Office Action mailed on Apr. 10, 2013, 16 pages.
U.S. Appl. No. 12/548,222, Non-Final Office Action mailed on Oct. 19, 2011, 19 pages.
U.S. Appl. No. 12/548,222, Office Action mailed on Jun. 20, 2012, 29 pages.
U.S. Appl. No. 12/548,281, Non-Final Office Action mailed on Apr. 12, 2013, 16 pages.
U.S. Appl. No. 12/548,281, Non-Final Office Action mailed on Oct. 3, 2011, 20 pages.
U.S. Appl. No. 12/548,281, Office Action mailed on Jun. 20, 2012, 29 pages.
U.S. Appl. No. 12/548,290, Final Office Action mailed on Jul. 30, 2012, 34 pages.
U.S. Appl. No. 12/548,290, Non-Final Office Action mailed on Oct. 3, 2011, 17 pages.
U.S. Appl. No. 12/548,290, Non-Final Office Action mailed on Apr. 15, 2013, 17 pages.
U.S. Appl. No. 12/874,197, Notice of Allowance mailed on Jun. 22, 2012.
U.S. Appl. No. 12/913,636, Final Office Action mailed on Jan. 8, 2013, 21 pages.
U.S. Appl. No. 12/913,636, Office Action mailed on Jun. 7, 2012.
U.S. Appl. No. 12/949,081, filed Nov. 18, 2010.
U.S. Appl. No. 12/949,081, Non-Final Office Action mailed on Jan. 9, 2013, 12 pages.
U.S. Appl. No. 12/957,194, filed Nov. 30, 2010.
U.S. Appl. No. 12/957,194, Non-Final Office Action mailed on Dec. 7, 2012, 11 pages.
U.S. Appl. No. 12/957,194, Notice of Allowance mailed on Mar. 20, 2013, 9 pages.
U.S. Appl. No. 12/957,201, filed Nov. 30, 2010.
U.S. Appl. No. 12/957,201, Final Office Action mailed on Apr. 25, 2013, 11 pages.
U.S. Appl. No. 12/957,201, Office Action mailed on Dec. 19, 2012, 15 pages.
U.S. Appl. No. 13/089,556, Non-Final Office Action mailed on Apr. 10, 2013, 10 pages.
U.S. Appl. No. 13/089,556, Office Action mailed on Nov. 6, 2012, 13 pages.
U.S. Appl. No. 13/089,556, filed Apr. 19, 2011.
U.S. Appl. No. 13/102,665, Office Action mailed on Feb. 1, 2013, 14 pages.
U.S. Appl. No. 13/107,742, Non-Final Office Action mailed on Feb. 14, 2013, 16 pages.
U.S. Appl. No. 13/184,528, Notice of Allowance mailed on Mar. 1, 2012.
U.S. Appl. No. 13/193,377, Office Action mailed on Jan. 17, 2013, 25 pages.
U.S. Appl. No. 13/193,377, Office Action mailed on Aug. 23, 2012, 48 pages.
U.S. Appl. No. 13/244,272, Final Office Action mailed on Mar. 28, 2013, 29 pages.
U.S. Appl. No. 13/244,272, Office Action mailed on Oct. 4, 2012.
U.S. Appl. No. 13/396,464, Office Action mailed on Sep. 7, 2012.
Abadi, et al., Yes Aurora: A Data Stream Management System, International Conference on Management of Data, Proceedings of the 2003 ACM SIGMOD International Conference on Management of Data, 2003, 4 pages.
Aho, et al., Efficient String Matching: An Aid to Bibliographic Search, Communications of the ACM, vol. 18, No. 6, Association for Computing Machinery, Inc., Jun. 1975, pp. 333-340.
Arasu, et al., An Abstract Semantics and Concrete Language for Continuous Queries over Streams and Relations, 9th International Workshop on Database programming languages, Sep. 2003, 11 pages.
Arasu, et al., An Abstract Semantics and Concrete Language for Continuous Queries over Streams and Relations, 9th International Workshop on Database programming languages, Sep. 2003, 12 pages.
Arasu, et al., CQL: A language for Continuous Queries over Streams and Relations, Lecture Notes in Computer Science vol. 2921, 2004, pp. 1-19.
Arasu, et al., Stream: The Stanford Data Stream Management System, Department of Computer Science, Stanford University, 2004, p. 21.
Arasu, et al., The CQL Continuous Query Language: Semantic Foundations and Query Execution, Stanford University, The VLDB Journal—The International Journal on Very Large Data Bases, vol. 15, No. 2, Springer-Verlag New York, Inc., Jun. 2006, pp. 1-32.
Avnur, et al., Eddies: Continuously Adaptive Query Processing, In Proceedings of the 2000 ACM SIGMOD International Conference on Data, Dallas TX, May 2000, 12 pages.
Avnur, et al., Eddies: Continuously Adaptive Query Processing, slide show, believed to be prior to Oct. 17, 2007, 4 pages.
Babu, et al., Continuous Queries over Data Streams, SIGMOD Record, vol. 30, No. 3, Sep. 2001, pp. 109-120.
Bai, et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose, et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemlD=979, Oct. 12, 2000, 4 pages.
Chan, et al., Efficient Filtering of XML documents with Xpath expressions, VLDB Journal D, 2002, pp. 354-379.
Chandrasekaran, et al., TelegraphCQ: Continuous Dataflow Processing for an Uncertain World, Proceedings of CIDR, 2003, 12 pages.
Chen, et al., NiagaraCQ: A Scalable Continuous Query System for Internet Databases, Proceedings of the 2000 SIGMOD International Conference on Management of Data., May 2000, pp. 379-390.
Colyer, et al., Spring Dynamic Modules Reference Guide, Copyright, ver. 1.0.3, 2006-2008, 73 pages.
Colyer, et al., Spring Dynamic Modules Reference Guide, Ver. 1.1.3, 2006-2008, 96 pages.
Conway, An Introduction to Data Stream Query Processing, Truviso, Inc., URL: http://neilconway.org/talks/streamjntro.pdf, May 24, 2007, 71 pages.
Demers, et al., Towards Expressive Publish/Subscribe Systems, Proceedings of the 10th International Conference on Extending Database Technology (EDBT 2006),Munich, Germany, Mar. 2006, pp. 1-18.
Demichiel, et al., JSR 220: Enterprise JavaBeans™, EJB 3.0 Simplified API, EJB 3.0 Expert Group, Sun Microsystems, Ver. 3.0, May 2, 2006, 59 pages.
Deshpande, et al., Adaptive Query Processing, Slide show believed to be prior to Oct. 17, 2007, 27 pages.
Diao, et al., Query Processing for High-Volume XML Message Brokering, Proceedings of the 29th VLDB Conference, Berlin, Germany, 2003, 12 pages.

(56) References Cited

OTHER PUBLICATIONS

Diao, Query Processing for Large-Scale XML Message Brokering, University of California Berkeley, 2005, 226 pages.
Dindar, et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez, et al., Build your own XQuery processor, slide show, at URL: http://www.galaxquery.org/slides/edbt-summer-school2004.pdf, 2004, 116 pages.
Fernandez, et al., Implementing XQuery 1.0: The Galax Experience, Proceedings of the 29th VLDB Conference, Berlin, Germany, 2003, 4 pages.
Florescu, et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab, et al., Issues in Data Stream Management, ACM SIGMOD Record, vol. 32, issue 2, ACM Press, Jun. 2003, pp. 5-14.
Golab, et al., Sliding Window Query Processing Over Data Streams, University of Waterloo, D Waterloo, Ont. Canada, Aug. 2006, 182 pages.
Gosling, et al., The Java Language Specification, Book, copyright, 3rd edition, FG, Sun Microsystems USA. D (due to size, reference will be uploaded in two parts), 1996-2005, 684 pages.
Hao, et al., Achieving high performance web applications by service and database replications at edge servers, Performance Computing and communications conference(IPCCC) IEEE 28th International, IEEE, Piscataway, NJ, USA, XP031622711, ISBN: 978-1-4244-5737-3, 2009, pp. 153-160.
Hopcroft, Introduction to Automata Theory, Languages, and Computation, Second Edition, Addison-Wesley, Copyright 2001, 524 pages.
Hulton, et al., Mining Time-Changing Data Stream, Proceedings of the Seventh ACM SIGKDD International Conference on Knowledge Discovery and Data Mining, Aug. 2001, 10 pages.
Jin, et al., ARGUS: Efficient Scalable Continuous Query Optimization for Large-Volume Data Streams, 10th International Database Engineering and Applications Symposium (IDEAS'06), 2006, 7 pages.
Kawaguchi, et al., Java Architecture for XML Binding (JAXB) 2.2, Sun Microsystems, Inc., Dec. 10, 1999, 384 pages.
Knuth, et al., Fast Pattern Matching in Strings, Siam J Comput 6(2), Jun. 1977, pp. 323-350.
Lakshmanan, et al., On efficient matching of streaming XML documents and queries, 2002, 18 pages.
Lindholm, et al., Java Virtual Machine Specification, 2nd Edition Prentice Hall, Apr. 1999, 484 pages.
Liu, et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? Complex Event Processing, downloaded, at URL:http://complexevents.com/?p=103, Apr. 29, 2011, 5 pages.
Madden, et al., Continuously Adaptive Continuous Queries (CACQ) over Streams, SIGMOD, Jun. 4-6, 2002, 12 pages.
Martin, et al., Finding Application Errors and Security Flaws Using PQL, a Program Query Language, OOPSLA'05, Oct. 16, 2005, pp. 1-19.
Babcock, et al., Models and Issues in Data Streams, Proceedings of the 21st ACM SIGMOD-SIGACT-SIDART symposium on Principles of database systems, 2002, 30 pages.
Motwani, et al., Query Processing Resource Management, and Approximation in a Data 0 Stream Management System, Proceedings of CIDR, Jan. 2003, 12 pages.
Munagala, et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah, et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion mailed on Nov. 17, 2011, 55 pages.
International Application No. PCT/US2012/034970, International Search Report and Written Opinion mailed on Jul. 16, 2012, 13 pages.
International Application No. PCT/US2012/036353, International Search Report and Written Opinion mailed on Sep. 12, 2012, 11 pages.
Peng, et al., Xpath Queries on Streaming Data, 2003, pp. 1-12.
Peterson, Petri Net Theory and the Modeling of Systems, Prentice Hall, 1981, 301 pages.
PostgresSQL, Manuals: PostgresSQL 8.2: Create Aggregate, believed to be prior to Apr. 21, 2007, 4 pages.
PostgresSQL, Documentation: Manuals: PostgresSQL 8.2: User-Defined Aggregates believed to be prior to Apr. 21, 2007, 4 pages.
Sadri, et al., Expressing and Optimizing Sequence Queries in Database Systems, ACM Transactions on Database Systems, vol. 29, No. 2, ACM Press, Copyright, Jun. 2004, pp. 282-318.
Sadtler, et al., WebSphere Application Server Installation Problem Determination, Copyright 2007, IBM Corp., 2007, pp. 1-48.
Sansoterra, Empower SQL with Java User-Defined Functions, ITJungle.com, Oct. 9, 2003, 9 pages.
Sharaf, et al., Efficient Scheduling of Heterogeneous Continuous Queries, VLDB, Sep. 12-15, 2006, pp. 511-522.
Stolze, et al., User-defined Aggregate Functions in DB2 Universal Database, Retrievd from: <http://www.128.ibm.com/deve10perworks/d b2/1 ibrary/tacharticle/0309stolze/0309stolze.html>, Sep. 11, 2003, 11 pages.
Stump, et al., Proceedings, The 2006 Federated Logic Conference, IJCAR '06 Workshop, PLPV '06: Programming Languages meets Program Verification, 2006, pp. 1-113.
Terry, et al., Continuous queries over append-only database, Proceedings of ACM SIGMOD, 1992, pp. 321-330.
Ullman, et al., Introduction to JDBC, Stanford University, 2005, 7 pages.
Vajjhala, et al., The Java Architecture for XML Binding (JAXB) 2.0, Sun Microsystem, D Inc., Final Release , Apr. 19, 2006, 384 pages.
Vijayalakshmi, et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang, et al., Distributed continuous range query processing on moving objects, DEXA'06 Proceedings of the 17th international conference on Database and Expert Systems Applications, 2006, pp. 655-665.
White, et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom, et al., CQL: A Language for Continuous Queries over Streams and Relations, Oct. 17, 2007, 62 pages.
Widom, et al., The Stanford Data Stream Management System, PowerPoint Presentation, Oct. 17, 2007, 110 pages.
Wu, et al., Dynamic Data Management for Location Based Services in Mobile Environments, Database Engineering and Applications Symposium, Jul. 16, 2003, pp. 172-181.
Zemke, XML Query, mailed on Mar. 14, 2004, 29 pages.

(56) References Cited

OTHER PUBLICATIONS

Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
What is BPM?, Datasheet [online]. IBM, [retrieved on Jan. 28, 2013]. Retrieved from the Internet: <URL: http://www-01.ibm.com/software/info/bpm/whatis-bpm/>.
U.S. Appl. No. 12/548,281, Final Office Action mailed Oct. 10, 2013, 21 pages.
U.S. Appl. No. 12/548,290, Notice of Allowance mailed on Sep. 11, 2013, 6 pages.
U.S. Appl. No. 12/949,081, Final Office Action mailed on Aug. 27, 2013, 13 pages.
U.S. Appl. No. 13/089,556, Final Office Action mailed on Aug. 29, 2013, 10 pages.
U.S. Appl. No. 13/177,748, Non-Final Office Action mailed on Aug. 30, 2013, 24 pages.
U.S. Appl. No. 13/193,377, Notice of Allowance mailed on Aug. 30, 2013, 19 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 12/913,636, Non-Final Office Action mailed on Jul. 24, 2014, 22 pages.
U.S. Appl. No. 12/957,201, Non-Final Office Action mailed on Jul. 30, 2014, 12 pages.
U.S. Appl. No. 13/764,560, Non Final Office Action mailed on Sep. 12, 2014, 23 pages.
U.S. Appl. No. 13/770,969, Non Final Office Action mailed on Aug. 7, 2014, 9 pages.
U.S. Appl. No. 14/302,031, Non-Final Office Action mailed on Aug. 27, 2014, 19 pages.
Abadi et al., Aurora: a new model and architecture for data stream management, the VLDB Journal the International Journal on very large data bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal, The International Journal on very large data bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish et al., Identifying robust plans through plan diagram reduction, PVLDB '08, Auckland, New Zealand, Aug. 23-28, 2008, pp. 1124-1140.
Krämer, Continuous Queries Over Data Streams—Semantics and Implementation, Fachbereich Mathematik and Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report mailed on Sep. 9, 2014, 12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's Learning Optimizer, Proc. of the VLDB, Roma, Italy, Sep. 2001, pp. 19-28.
U.S. Appl. No. 13/838,259, filed Mar. 15, 2013, Deshmukh et al., Unpublished.
U.S. Appl. No. 13/839,288, filed Mar. 15, 2013, Deshmukh et al., Unpublished.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/- newhall/unixhelp/C_strings.html> [retrieved on May 13, 2014], Swarthmore College, Jun. 12, 2007, 3 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
SQL Tutorial-In, Tizag.com, http://web.archive.org/web/20090216215219/http://www.tizag.com/sqiTutorial/sqlin.php, Feb. 16, 2009, pp. 1-3.
U.S. Appl. No. 12/548,187, Final Office Action, mailed Jun. 10, 2013, 18 pages.
U.S. Appl. No. 12/548,222, Notice of Allowance, mailed Jul. 18, 2013, 12 pages.
U.S. Appl. No. 13/102,665, Final Office Action, mailed Jul. 9, 2013, 17 pages.
U.S. Appl. No. 13/107,742, Final Office Action, mailed Jul. 3, 2013, 19 pages.
Notice of Allowance for U.S. Appl. No. 11/977,437 dated Jul. 10, 2013, 10 pages.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With MATCH_RECOGNIZE, Oracle™ Complex Event Processing CQL Language Reference, 11g Release 1 (11.1.1) E12048-01, May 2009, pp. 15.1 to 15.20.
Supply Chain Event Management: Real-Time Supply Chain Event Management, product information Manhattan Associates, 2009-2012.

(56) References Cited

OTHER PUBLICATIONS

What is BPM?, Datasheet [online]. IBM, [retrieved on Jan. 28, 2013]. Retrieved from the Internet: <URL: http://www-01.ibm.com/software/info/bpm/whatis-bpm/>.
U.S. Appl. No. 11/601,415, Non-Final Office Action mailed on Dec. 11, 2013, 58 pages.
U.S. Appl. No. 12/396,464, Non Final Office Action mailed on Dec. 31, 2013, 16 pages.
U.S. Appl. No. 12/548,281, Final Office Action mailed on Oct. 10, 2013, 21 pages.
U.S. Appl. No. 13/089,556, Non-Final Office Action mailed on Jan. 9, 2014, 14 pages.
Chandramouli et al., High-Performance Dynamic Pattern Matching over Disordered Streams, Proceedings of the VLDB Endowment, vol. 3, Issue 1-2, Sep. 2010, pp. 220-231.
Chapple, Combining Query Results with the Union Command, ask.com Computing Databases, downloaded from: http://databases.about.com/od/sql/a/union.htm.
Chui, WebSphere Application Server V6.1—Class loader problem determination, IBM.com, 2007.
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
U.S. Appl. No. 12/949,081, Non-Final Office Action mailed on Jan. 28, 2015, 20 pages.
U.S. Appl. No. 12/957,201, Notice of Allowance mailed on Jan. 21, 2015, 5 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
U.S. Appl. No. 13/906,162, Non-Final Office Action mailed on Dec. 29, 2014, 10 pages.
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
Cranor et al. "Gigascope: a stream database for network applications," Proceedings of the 2003 ACM SIGMOD international conference on Management of data, pp. 647-651 (Jun. 2003).
Non-Final Office Action for U.S. Appl. No. 13/830,378 dated Feb. 25, 2015, 23 pages.
International Application No. PCT/US2014/068641, International Search Report and Written Opinion mailed on Feb. 26, 2015, 11 pages.
European Patent Application No. 12783063.6, Extended Search Report mailed Mar. 24, 2015, 6 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
Final Office Action for U.S. Appl. No. 13/828,640 dated Jun. 17, 2015, 11 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Final Office Action for U.S. Appl. No. 13/770,961 dated Aug. 31, 2015, 28 pages.

(56) References Cited

OTHER PUBLICATIONS

Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
Japan Patent Office office actions JPO patent application JP2013-529376 (Aug. 18, 2015).
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
China Patent Office office actions for patent application CN201180053021.4 (Oct. 28, 2015).

\* cited by examiner

| TRANSACTION_CID | TRANSACTION_TID |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |

Transaction Context Table 502

| TRANSACTION_CID | TRANSACTION_TID |
|---|---|
| 1 | 2 |
| 2 | 2 |
| 3 | 1 |
| 4 | 1 |
| 5 | 1 |
| 6 | 1 |
| 7 | 1 |
| 8 | 1 |
| 9 | 1 |
| 10 | 1 |

Transaction Context Table After Insert 504

FIG. 5

CONFIGURABLE DATA WINDOWS FOR ARCHIVED RELATIONS

CROSS REFERENCES TO RELATED APPLICATIONS

The present application is a non-provisional of and claims the benefit and priority under 35 U.S.C. 119(e) of U.S. Provisional Application No. 61/707,641 filed Sep. 28, 2012 entitled REAL-TIME BUSINESS EVENT ANALYSIS AND MONITORING, the entire contents of which are incorporated herein by reference for all purposes. This application is also related to application Ser. No. 13/829,958, filed on the same day herewith, entitled "MANAGING CONTINUOUS QUERIES WITH ARCHIVED RELATIONS" and application Ser. No. 13/830,428, filed on the same day herewith, entitled "PROCESSING EVENTS FOR CONTINUOUS QUERIES ON ARCHIVED RELATIONS," the entire contents of each is hereby incorporated by reference as if fully set forth herein, under 35 U.S.C. §120.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), click-stream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Continuous queries in the presence of archived relations with configurable data windows may be provided. In some examples, a system may be provided, the system may include memory storing instructions and/or processors configured to access the memory and execute the instructions to at least identify a query that identifies at least a data stream. The system may also execute the instructions to identify a configurable window size. Additionally, in some examples, the system may execute the instructions to initialize the query with at least a portion of historical data based at least in part on the window size. Further, the system may also be configured to execute the instructions to evaluate the query based at least in part on the data stream and the portion of the historical data. In some aspects, the query may comprise a continuous query configured to process incoming real-time business event data of the data stream. The evaluation of the query may include at least applying the query against the data stream based at least in part on the configurable window size. Additionally, in some examples, the data stream may comprise a relation configured with a second configurable window size for referencing a portion of the data stream within a second window with a size based at least in part on second configurable window size.

Additionally, in some examples, the second window may be configured to move along the data stream with time. The historical data may not be included in the data stream at a time after initializing the query. And, the historical data may include business event data from the data stream at a time before initializing the query. In some examples, the system may also be configured to execute the instructions to at least evaluate the query by at least forming a query graph with nodes representing operators of the query. Additionally, at least one of the nodes may identify the window size. Further, in some aspects, the system may be configured to execute the instructions to at least traverse the query graph topographically from a source. The one or more processors may also be configured to execute the instructions to at least initialize the query with at least the historical data at a lowest stateful operator identified in the query graph.

Additionally, in some examples, a computer-readable memory may be provided. The memory may be configured to store instructions that cause one or more processors to receive a continuous query configured to process an archived relation, the continuous query including at least one of an identifier of the data stream or an identifier of historical data. The instructions may also cause the processors to generate a query graph based at least in part on the continuous query. Additionally, in some examples, the instructions may cause the processors to receive a window size from an entity associated with the archived relation. In some aspects, the instructions may also cause the processors to initialize the continuous query with at least a portion of historical data. Further, in some examples, the instructions may cause the one or more processors to evaluate the continuous query with respect to the archived relation and the window size based at least in part on the query graph. The archived relation may be based at least in part on the historical data. In some aspects, at least one of the archived relation or the historical data may be identified by a data definition language annotation of the continuous query. The data definition language annotation may identify at least one of a location of the historical data, a source of the archived relation, a data object associated with the archived relation, operation information associated with processing the continuous query, one or more relevant columns of a database corresponding to the historical data, a data object corresponding to output of the continuous query, or a location for providing the output of the continuous query. Additionally, in some examples, the plurality of instructions may further comprise instructions that cause the one or more processors to determine an amount of historical data with which to initialize the continuous query based at least in part on the window size. Further, the continuous query may be initialized with the at least a portion of the historical data at a stateful operator of the query graph while traversing the query graph topographically from a source of the query graph.

Further, in some examples, a computer-implemented method may be provided. The method may be configured to receiving a continuous query configured to process an archived relation associated with business event data, the continuous query including an identifier of the archived relation and an identifier of historical data associated with the stream. Additionally, the method may be configured to receive a window size configured to identify a bounded range of the archived relation to process. The method may also be configured to generate a query graph based at least in part on the continuous query, the query graph including at least a node representing an operator of the continuous query. Additionally, in some aspects, the method may be configured to traverse the query graph topographically from a source node of the query graph to identify a stateful operator. The method may also be configured to initialize the continuous query with at least a portion of historical data at the identified stateful operator and/or evaluate the continuous query with respect to the archived relation based at least in part on the window size. In some aspects, the historical data may include business event data from a point in time of the archived relation prior to initializing the continuous query. Additionally, in some aspects, the method may also be configured to determine an optimal amount of the historical data with which to initialize the continuous query based at least in part on the operator of the continuous query. Further, the method may also be configured to determine an optimal amount of the historical data with which to initialize the continuous query based at least in part on the window size.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

FIG. 5 is a simplified block diagram illustrating at least some additional features of the management of continuous queries with archived relations described herein, according to at least one example.

DETAILED DESCRIPTION

Figure 1:
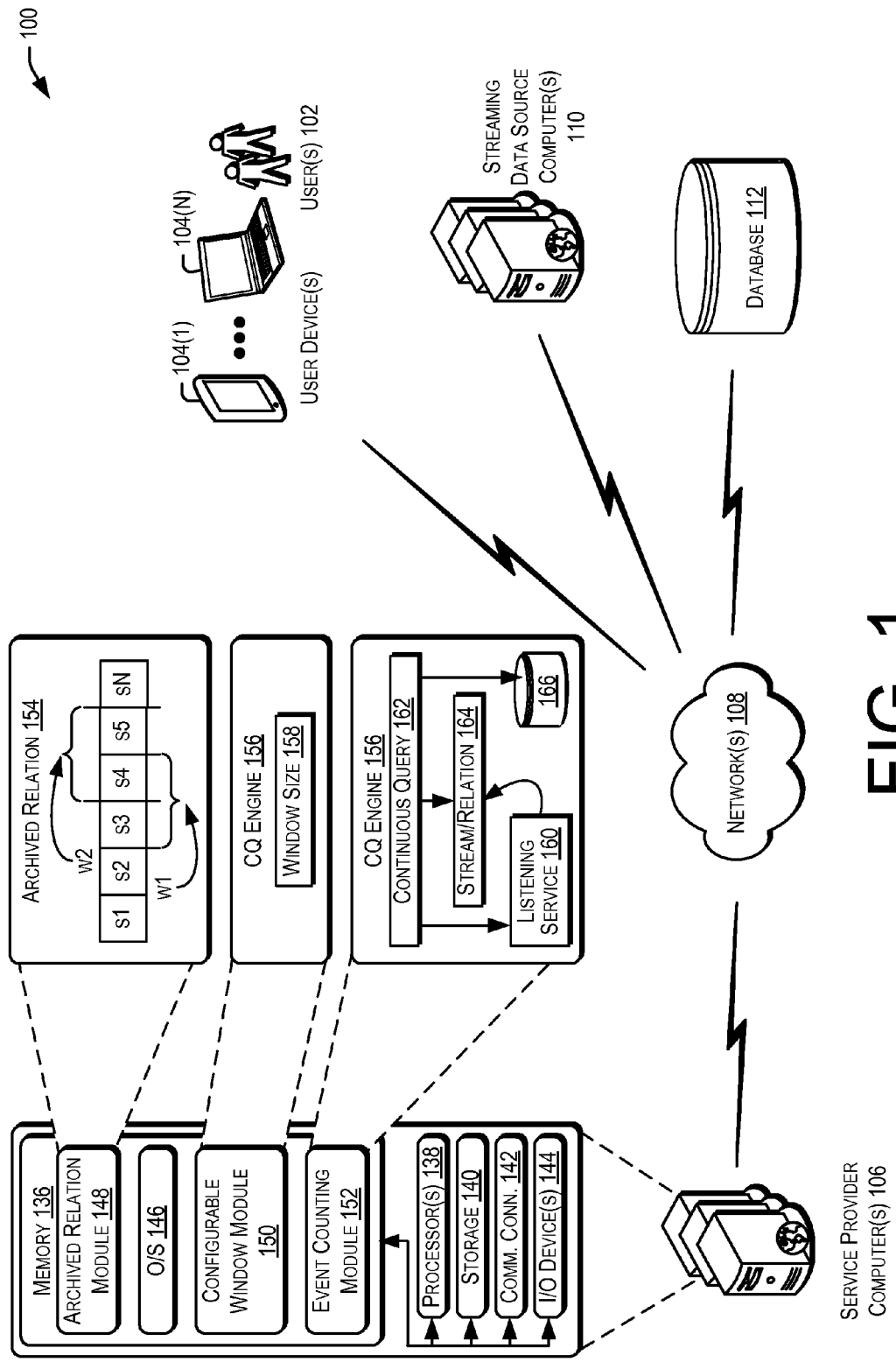
FIG. 1 is a simplified block diagram illustrating an example architecture for managing continuous queries with archived relations, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, mechanisms to support continuous query language (CQL) queries (also referred to as "query statements") with one or more archived relations, for example, including but not limited to, a CQL relation this may be non-empty when created, may be provided. For example, in some scenarios, a CQL relation may be defined by applying a window on a stream. In other words, a relation may be a bounded dataset. For example, given an event stream, a relation may be first be defined by a window that includes a particular number or set of elements of the stream (e.g., within the window). However, a relation may, in some cases, be created in an empty state. That is, the window may be defined; however no events may be included the relation. On the other hand, an archived relation may include event data upon creation. In some examples, an archiver or other data object may be responsible for managing the real-time data to be utilized in creation of the archived relation and/or may provide this data to an engine configured to generate or otherwise manage the archived relations.

Additionally, in some examples, mechanisms for supporting the CQL queries with archived relations may also enable configuration of particular data windows of the archived relations. These data windows may be configured, generated, managed, updated, and/or otherwise manipulated by a user, administrator, or other entity associated with the archived relation and/or event data (e.g., business event data) of a user. Further, in some examples, archived relations within continuous queries may be implemented in such a way as to avoid missing and/or double counting change notifications. For example, when a query is run, it may initially be run against a data object backing store to establish the current state of the query, and then listen for and process change notification from that data object. However, change notifications may be missed while a complex event process (CEP) implementing the query is running the initial query. Additionally, change notifications may also be double-counted if the change is already in the initial query. Yet, in some examples, missed and/or double-counting change notifications may be avoided by establishing a listener before the initial query and/or utilizing a transaction identifier (TID), a context identifier (CID), or other mechanism for managing change events.

In general, a continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, business intelligence (BI) may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefore expand from a mere strategic analytical tool into the front lines in business operations. As such, BI systems may also be configured to analyze event streams and compute aggregates in real time.

In some examples, a continuous query language service (CQ Service) may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQ Service and the CQ Service may also act as a logical database (DB) gateway for a CQL engine. In this way, the CQL engine may be able to leverage the BI analytics server for its analytics capabilities and semantic modeling.

In some examples, the CQ Service may provide, among other things, the following functionalities:
  Remoting service for BI Analytics Server as CQL engine Gateway;
  Event source/sink adapter;
  Generate data definition languages (DDLs) from logical SQL plus CQL extensions;
  Provide unified model for all types of continuous queries and implementation selections;
  Maintain metadata and support restartability; and
  High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring (BEAM) system may include a CQL engine to process and/or receive in-flight data. For example, a CQL engine may be an in-memory real-time event processing engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation; that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2 >c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archive relation may be specified by a user. A window, in some aspects, in relation to an archived relation, may include a node in a query graph that analyzes or otherwise evaluates incoming streamed content. In other words, the window may define the amount of streamed content that me analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspect, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for managing continuous queries with archived relations may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of archived relations, configurable data windows associated with archived relations, and/or accurately counting change events associated with managing archived relations described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least an archived relation module 148, a configurable window module 150, and/or an event counting module 152. As used herein, modules may refer to programming modules executed by servers or clusters of servers that are part of a service. In this particular context, the modules may be executed by the servers or clusters of servers that are part of the service provider computers 106. In some examples, the archived relation module 148 may be configured to, receive, identify, generate, or otherwise provide one or more archived relations 154 that may include reference to one or more event stream entries s1, s2, . . . , sN. For example, an archived relation may be defined by applying a window on at the stream including these entries (i.e., s1 through sN). As such, the archived relation may be the bounded dataset including these entries. However, the entries may be non-empty upon generation including, but not limited to, having one or more of the entries (e.g., s1 and/or s2, more entries, or less) of the relation pre-loaded from Persistence or some other database of historical data. As such, these pre-loaded entries may include the historical data, and the remainder of the relation may include incoming streaming data. In some examples, the archived relation 154 may first be identified as {s3, s4}. However, when the window moves from w1 to w2, the archived relation 154 may be identified as {s4, s5} and may have been changed by a delete of s3 and/or an insert of s5.

As noted above, an archived relation 154 may be a CQL relation that is (possibly) non-empty at the "instant" of its creation. This is in contrast with a "normal" CQL relations which have empty contents at the "instant" when they are created. In some examples, it is imagined as if the contents of the archived relation 154 as of the instant of its creation existed from the "beginning of time" (Long.MIN_VALUE). In the BEAM context, it is useful to note that the objects (in some examples, all the objects) of a CQL engine 156 may be created every time on server startup. In some respects, an archived relation 154 may be similar to a "normal" CQL internal relation. In particular, operations (Relation-to-Relation operations like JOIN, GROUP AGGR, ORDER BY TOP N as well as Relation-to-Stream operations like I/D/RSTREAM) may retain the same semantics as they have over "normal" CQL internal relations. Additionally, in some examples, an "archiver" may be a Java class that implements a specific contract with the CQL engine 156. It may implement the IArchiver interface or some other interface capable of enabling an archiver. This "archiver" along with the identity of the logical entity managed by the "archiver" that corresponds to the archived relation 154 (for example, the name of the Data Object) may be specified as part of the DDL statement used to create the archived relation 154.

In some aspects, the archiver may be implemented based at least in part on a contract with the CQL engine 156 to at least provide the contents of an archived relation 154 at the time of its creation. Additionally, the archiver may be expected to maintain the "time-varying" contents of the archived relation 154 on its own (e.g., external to the CQL engine 156). However, in some examples, the archiver may be stateless. In this example, the archiver may implement a method (e.g., "execute( )") that executes the query handed to it by the archived relation framework. The archiver may then give the contents back to the archived relation framework once the method is executed. The archiver may also be configured to provide querying capabilities on the archived relation 154 (e.g., expressed as an SQL-99 query). Additionally, in some examples, FROM clause item(s) in the query presented to the "archiver" may be the name of the "archiver" entity and/or the name of the DataObject (e.g., maintained on the durable store). When the FROM clause items are the DataObject names, they may be mapped to the archived relation in the creation DDL. Additionally, or alternatively, the archiver name may be used to lookup the archiver instance (there could be more than one archiver) and then call execute(query) on that archiver instance. The attribute names used in the query may be the column names specified in a CREATE ARCHIVED RELATION DDL or other appropriate DDL, as desired. While executing a query, the "archiver" may run the query on a snapshot of the Data Object(s) that contains committed changes as of txn T_n where T_n is not earlier than the latest transaction for which events for the Data Object have been presented as streaming input. In particular, there may have been no streaming Data Object events that have been provided as input corresponding to "later" transactions.

Further, the "archiver" may return the ID of the transaction as of which this query was executed. This ID may be a monotonically increasing number (not necessarily contiguous) such that later transactions have larger IDs as compared to earlier transactions. For UPDATE events, the "archiver" may provide as part of the streaming event, the OLD as well as the NEW values. Additionally, or alternatively, in some examples, a persistence service may send the change notifications with both OLD and NEW values to the CQ Service. In this way, the CQ Service may be able to perform the appropriate operations on the archived relations. For DELETE events, the "archiver" may provide the DELETE event as a streaming event if (in some examples, "if and only if") it passes validation (i.e., it matches with an existing Data Object record). In some examples, the functionality of the archiver may enable a scenario where there are no Data Object events that the query does not process. The CQL engine 156 may also enable a scenario where no duplicate events are processed by skipping the processing of all Data Object events with transaction identifiers<=the transaction identifier returned by the "archiver" as part of executing a "Snapshot" query. In some examples, the archiver may be comparable to a Persistence Service. Alternatively, or in addition, snapshot information at the querying instant may also be derived from the transaction context table. This snapshot information may be maintained in the CQL Engine and a snapshotID (increasing identifier) may be associated with it. The same may be set in the input queues of some selected operators in that query's plan.

These are called 'connector' operators and they may represent the place at which a local query plan may join the global (overall) query plan. When an event arrives in CQL Engine, a snapshotID may be computed for that event using the context ID and transaction ID values in it. The snapshotID may be computed using the snapshot information maintained in CQL Engine. The snapshotID of the event may then be compared with the snapshotID of the input queue. If the ID in the event>ID in the queue then it may be processed otherwise it may have already been accounted for before and may therefore ignored to avoid double-counting.

The introduction of the archived relation 154 as a native CQL concept enables the CQL engine 156 to determine the optimal amount of data to be fetched in order to initialize the state of the operators for a query defined over the archived relation 154. In some examples, as the final step of query compilation, following the query plan generation (and/or merging with the global plan) a state initialization phase may be introduced to determine an optimal set of queries to be run against the "archiver" (e.g., for the purposes of operator state initialization). In some cases, the state initialization algorithm that is used to determine a set of queries (e.g., an optimal set) may defer materialization of state up the operator chain until a stateful operator is encountered (which aggregates data and hence may retrieve less data as compared to materialization of all details/facts in memory). The first step in query execution, even before the state initialization queries are run, may be the execution of a snapshot query and/or the delivery of the results to the client. In some examples, the snapshot query (also referred to as the "archiver query") may be part of the state initialization where the operators may be initialized with the contents of the results. These results may then be propagated to downstream operators (e.g., all downstream operators), thus outputting the result. The queries determined by the state initialization algorithm may then be run next. At the end of this first step, all the operators may have their state appropriately initialized and the query may be ready to process the streaming events.

When a CQL query refers an archived relation 154, during system restart, the CQL engine 156 may be configure to enable a scenario where the states of execution operators in the query are initialized to the values that they had prior to a shutdown. Alternatively, or in addition, each time a query is (re)started, whether as part of shutdown or voluntarily, the query may issue a fresh or new archiver query to initialize state again. In some examples, this may be different at time t0+delta than it was at t0. In some cases, a state initialization algorithm may be configured to handle this functionality. In some examples, each (or every) archived relation 154 may map to an archiver object that keeps track of the events forming the relation and may be able to answer the SQL queries (similar to a database table) issued to it. Additionally, initializing the state of an execution operator in a CQL query may a two-step process, including at least: issuing an appropriate SQL query to the archiver that maps to the archived relation 154 on which the CQL query depends; and use the returned results to initialize the state of the operator. Deferring materialization of the events (obtained from the archiver) may result in lesser memory and/or processing time consumption. Additionally, or in the alternative, memory savings may be due to finding the appropriate operators that minimize the memory. For example, aggregated/summarized data may be brought into memory, resulting in significant memory savings.

In some examples, the state initialization process (which may be one step in the overall process, and may be implemented when a CQL query is started and is referring an archived relation(s)) may include: obtaining a logical plan for the query using the metadata object, constructing a physical plan form the logical plan, optimizing the local physical plan using an optimizer, sharing operating to get a global physical plan, adding auxiliary structures (e.g., synopsis, store, queue, etc.), and instantiating the query (e.g., constructing execution operators and/or supporting execution structures). Additionally, the appropriate location from where to call the state initialization algorithm may be right after the local physical plan optimization. In some examples, the state initialization algorithm may only be called when the query depends on or more archived relations 154.

In some examples, given binary operators, children operators may be marked as query operators. Also if after traversing the entire query plan, no query operator is identified, the root may be marked as the query operator. Once the operators are identified as query operators, during the instantiation phase if the isQueryOperator flag is set then a method to execute the constructed archiver query would be called from the Operator Factory code. The returned result set may then be converted into a set of tuples and the list may be set in the execution operator instance. In this way, upon instantiation execution operators that need a state may have a list of tuples that may be sufficient for initializing its state. Upon instantiation, one more pass may be made over the query plan in topological order in which a method that would use these tuples to initialize state and propagate it downstream may be called. This method may be operator-specific and/or the initialization processing may be similar to populating synopsis, maintaining internal data-structures, and so on.

In some examples, the following CQL query on top of a "sales" archived relation 154 may be implemented:

```
SELECT SUM(sales), productid
FROM sales
WHERE region = "APAC"
GROUP BY productid
```

In some examples, the query plan when compiled in the CQL engine 156 may described as:

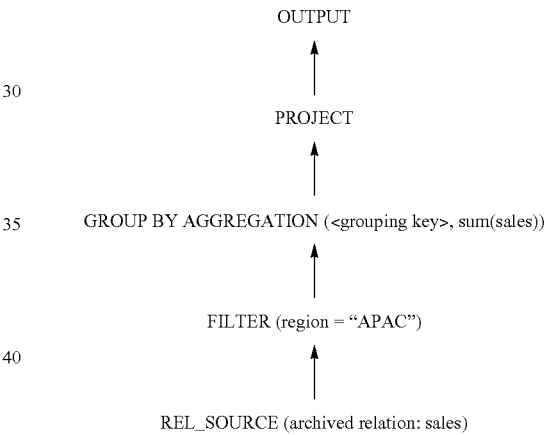

In some examples, when the CQL engine 156 compiles the aforementioned query, it may determine that the query is expressed against a relation (e.g., the archived relation 154) whose state at startup is available externally and could potentially be large. There may be a set of operators in CQL that are stateful (e.g., GROUP BY, PATTERN) while others (e.g., FILTER, PROJECT, OUTPUT) may not be stateful. The state initialization algorithm may work as follows for the scenario in consideration: a REL_SOURCE operator may skip calling the archiver since it is stateless for archived relations. Next up is FILTER, which may also be stateless so it may skip calling the archiver for state too. Next, the GROUP BY operator may encountered, and it may invoke the archiver to fill up its state using the following SQL query (as desired, the archiver query may be a SQL query formed by using a sub-query based approach and may be more complicated than the following):

```
SELECT SUM(sales), COUNT(*), productid
FROM SALES_DO
WHERE region="APAC"
GROUP BY productid
```

Note that even though the user's query may not include the COUNT aggregate, the GROUP BY may issue a SQL query that has a COUNT aggregate. This may be because this piece of information may be requested by the GROUP BY operator (as part of its state) to determine whether a group (corresponding to a "productid" in this example) becomes empty so that it can release any resources (like memory) that it might be using related to the group.

Now, considering the situation where a –ve tuple arrives. In the above scenario REL_SOURCE may not maintain any state so it may let the next operator in the chain decide (rather than throw an exception as it might for a "regular" CQL relation). The FILTER operator also may not maintain any state, and it may do the same. Next, the GROUP BY operator may see the tuple. Since its state has been initialized it may be able to successfully locate the corresponding group and proceed with the rest of the processing. For example, if it is a tuple with region="APAC" and productid="Mobile Phones," the SUM aggregation function may reduce the running total for "Mobile Phones" by the amount present in the tuple.

In some examples, the following CQL query on top of a "sales" archived relation 154 may be implemented for determining the median as opposed to sum, in the above example:

```
SELECT MEDIAN(sales), productid
FROM sales
WHERE region = "APAC"
GROUP BY productid
```

In some examples, the query plan when compiled in the CQL engine 156 may described as:

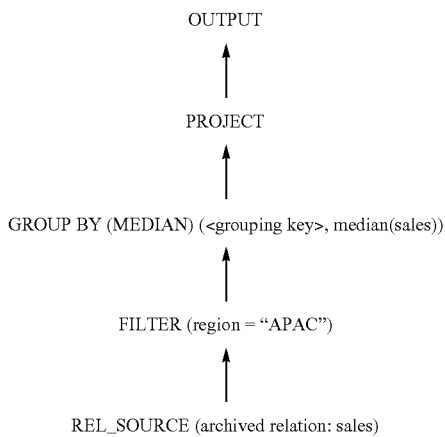

In some examples, the state initialization algorithm works as follows for the scenario in consideration. The REL_SOURCE operator may skip calling the archiver since it may be stateless for archived relations. Next up is FILTER, which may also be stateless so it may skip calling the archiver for state too. Next, the GROUP BY operator may be encountered. This operator may be stateful and thus may request state initialization. Here the query involves at least one holistic function (MEDIAN), so it is may not be sufficient to bring aggregated/summary state from the database. The entire set of values over which the MEDIAN is to be calculated may be requested for the GROUP BY state.

Thus, at this stage, having identified the lowest stateful operator and determined that more detail may be requested to make up its state, the operator plan may be traversed in the opposite direction (i.e., "down"). That is, the plan may be traversed from the top down from this stage on. In some examples, the responsibility to construct the state will fall on the next operator down the tree, which in this case may be FILTER and it may issue the following SQL query (to the "archiver") that may bring the requested set of values into memory:

```
SELECT sales, productid
FROM SALES_DO
WHERE region = "APAC"
```

In some examples, once these tuples are retrieved, the FILTER may propagate these values upstream and the GROUP BY may build its state by constructing a tree or graph (e.g., but not limited to, an Augmented Red-Black tree or the like). This data structure may enable very fast subsequent (O (log n) time) incremental MEDIAN calculation. In some examples, if the FILTER were absent in the above query, the responsibility to construct state may have fallen on the REL_SOURCE operator and the entire contents of the relation (as an optimization, only the relevant fields accessed by the query would be retrieved for each row as opposed to the entire row. Of course, if all fields are accessed, the entire row would be fetched) may have been brought into memory.

In some aspects, for handling minus events reaching a query based on an archived relation 154, additional support may be useful. Some of the CQL Engine 156 operators like Project, Binary operator like join maintain a lineage synopsis. The lookup in this lineage synopsis is based on a TupleId. When a PLUS tuple comes it may be inserted into the synopsis. When a MINUS tuple comes to that operator we look up the lineage synopsis which happens on the tupleId. The problem that can come in the context of an archived relation 154 is as follows:

1. When the query starts, an operator which maintains a lineage synopsis may be identified as the query operator and it may query the archiver and convert the returned results into tuples and puts them in a lineage synopsis.
2. Additionally, when the query starts to run, the first tuple it receives may be a MINUS corresponding to one of the archived plus tuple. Here, the ID of the PLUS and MINUS tuple may not match and this will lead to a failed lookup and incorrect results.
3. In the normal relation case, a relation source may help ensure that PLUS and MINUS tuples have the same IDs since it may maintain a synopsis, but for the archived case it may not be possible.

As such, a BEAM Persistence layer may assign an event ID to each event and INSERT (PLUS), DELETE (MINUS), and UPDATE notifications of an event may all have the same value of this ID. This facility may be utilized to avoid the problem mentioned above. Thus, one more clause may be added to the archived relation 154 DDL to specify an EVENT IDENTIFIER clause. This may be a column of type CQL bigint and this column may have the same value for plus, minus, and update tuples for an event In some cases, within the CQL Engine 156, the column specified in the EVENT IDENTIFIER clause may be utilized. For example, when the archiver is queried, this field is may be forced to be present in the SELECT list and use the values of this field to set the tupleId while converting the records into tuples. Also when a normal input event comes (e.g., when the query is running) the value in this field may be assigned as the tupleId while converting the TupleValue into ITuple in the Relation Source code. This may enable a configuration for ensuring that PLUS and MINUS of an event have the same tuple ID.

In some examples, the following syntax may be utilized for an archived relation DDL:

```
CREATE ARCHIVED RELATION
SalesDataObjectChannel (region char(8), productid int, sales float,
    eventid bigint)
ARCHIVER com.oracle.beam.PersistenceServiceArchiverImpl
ENTITY "SALES_DO"
EVENT IDENTIFIER eventid
```

This DDL to create the Archived Relation may be invisible to the end users and also also other components. For example, the creation of the archived relation may be handled "under the covers" by the CQL processor code when the EPN contains the Data Object node connected to a CQL processor node. For example, consider the following EPN:

(SalesDataObjectNode for SALES_DO)→(SalesDataObjectChannel)→(CQL Processor)

This EPN code may use the field names of the Data Object as the column names of the archived relation that it creates in the CQL engine 156 thereby ensuring that the names of the fields and the order of the fields match.

Additionally, in some examples, archived streams may be enabled via the CQL engine 156 and/or other engines. Conceptually, an archived stream may be very similar to the Archived Relations feature. But owing to the semantic difference between a stream and a relation, certain changes may be made to the design and syntax of the archived stream as compared to the archived relation feature. For example, relation contents may undergo changes when additions, updates, or deletions occur. As such, the contents can grow or shrink in size with time. However, for a stream, by definition, updates and deletions are not possible. So the stream size may only keep increasing. Thus, the size of the past contents of a stream may be prohibitively large and most of the times a user would be interested in only a subset of the immediate past maintained by the archiver.

As such, the following syntax may be utilized for an archived stream DDL:

```
CREATE ARCHIVED STREAM <stream_name> ( stream schema )
ARCHIVER <archiver_name> ENTITY "<entity_name>"
TIMESTAMP COLUMN <timestamp_col_name>
REPLAY LAST ( <time_spec> | <intToken> ROWS)
[IS SYSTEM TIMESTAMPED]
```

Here, the ARCHIVER and ENTITY clause may have the same meaning as with the archived relation 154. However, the EVENT IDENTIFIER clause may not needed since it is generally only for handling MINUS events which cannot come as input for a stream. Additionally, the REPLAY LAST clause may allow a user to specify the part of the immediate past that is of interest. The user can specify it either as a time range or in terms of number of rows. So, for example, the REPLAY clause can be REPLAY LAST 30 MINUTES (in which case the records that have arrived in the past 30 minutes may be fetched from the archiver) or REPLAY LAST 50 ROWS (in which case latest 50 records ordered by arrival time may be fetched from the archiver).

The TIMESTAMP COLUMN clause may be utilized for identification of records that may be returned while querying the archiver. This may be used in the WHERE clause of the archiver query that determines the records that are part of the result set of the archiver query. The values in this column may also be utilized while assigning the timestamp to the tuples (which may be obtained by querying the archiver) inside the CQL Engine 156. This column name could be the name of the column in the DO that has the creation timestamps assigned by BEAM persistence.

Additionally, in some examples, the configuration window module 150 may be configured to generate, receive, and/or determine a window size 158 for configuring one or more an archived relation 154 of the CQL engine 156. However, in some examples, defining different windows over an archived relation may not create separate archived relation instances. Instead, when a window is applied, there be only a single archived relation instance, and the window may determine the data in that archived relation which is of "interest" for that particular query. As noted above, the window size 158 may configure the size of the window w1, w2, and/or wN of the archived relation 154. In this way, the user may have control of the window size and may designate the size based at least in part on information associated with the business event data and/or personal concerns, business goals, and/or other factors, as desired.

Further, in some examples, the event counting module 152 may be configured to implement one or more listening services 160 within the CQL engine 156 or other engine configured to enable correct counting of change events within a stream or archived relation 154. As discussed briefly, when a continuous query 162 indicates a dependency on a stream and/or archived relation 164 managed by the CQL engine 156, the CQL engine 156 may implement the listening service 160. In at least some examples, the timing of the implementation of the listening service may determine whether or not change events in the stream/relation 164 are counted correctly. Additionally, as noted, in some examples, the continuous query 162 may be configured to initialize data of the archived relation 164 by querying against a data store 166 of historical and/or warehouse data.

In some examples, when a query is run in the CQL engine 156 it may initially run the query against the a DataObject backing store to establish the current state of the DataObject and then listen for and process change notifications from that DataObject. This creates two problems: change notifications may be missed while the CQL engine 156 is running the initial query; change notifications might be double-counted if the change is already in the initial query.

Missing change notifications can be eliminated by establishing the change notification listener before the initial query is started but not processing them until the archiver query execution is complete and/or the state initialization is done. These change notifications may be buffered in the messaging service (JMS) until the CQL engine 156 is ready to process them. In some cases, eliminating double-counting of change notifications may be performed by supplying additional information to a Persistence Service to allow the CQL engine 156 to determine which change notifications are included in the initial query result and which are not.

In some examples, an additional column may be added (e.g. DATAOBJECT_ID) to each DataObject that contains the transaction ID of the last transaction to affect that DataObject instance (row). However, in other examples, no additional column is added and, instead, a transaction context may be utilized. This transaction ID may be an internal BEAM artifact not to be confused with any other transaction mechanism such as JTA. This transaction ID may, in some examples, be a monotonically increasing integer. Some (or all) DataObject instances (e.g., rows) modified by the same JTA transaction may be tagged with the same transaction ID. Additionally, transaction IDs may be committed in ascending order. This same column may be included in DataObject change notifications. Given the above, if a query includes MAX (DATAOBJECT_TID), then the highest transaction ID present in our query result may be known. As such, the transaction ID value in any change notifications may be compared against the highest value because a value less than or equal may be ignored (i.e., because it may already be counted) and a value greater than may be processed (i.e., because it may not yet be counted).

However, in some cases, in order to have transaction IDs committed in ascending order, the DataObject transactions may be serialized. Yet, this may have a detrimental affect on concurrency. Still, concurrency may be increased by introducing the notation of a context ID. In some examples, each context ID may maintain its own transaction ID. Exclusive access to a BEAM context may then be acquired by JTA transactions that perform operations against BEAM DataObjects. This same BEAM context may then be used for operations (e.g., all operations) performed by that JTA transaction and ultimately released upon commit or rollback of the JTA transaction. This may allow processing to proceed in parallel across BEAM contexts. The level of concurrency may then be proportionate to the allocation of BEAM contexts. An additional column (DATAOBJECT_CID) can be added to each DataObject to hold the ID of the last context to modify that DataObject instance (row). However, in other examples, no additional column is added and, instead, a transaction context may be utilized. Context IDs, like transaction IDs, may also be included in DataObject change notifications. Yet, this may change the requirements on the query side in that one may need to obtain the MAX(DATAOBJECT_TID) for context IDs in order to eliminate double-counting.

In some examples, the same level of concurrency can be achieved without adding additional columns to the DataObject if the notion of a Transaction Context entity is introduced. A new Java class and associated JPA entity may then be created to maintain the state of context IDs in the database. The transaction context entity may contain a context ID and its associated (highest, last used) transaction ID. The context ID may be generated as a sequence and may be the primary key for the entity.

When a Persistence Service is initialized it may create a configured number of transaction context instances. These transaction context instances may be for the sole use of that Persistence Service. If another Persistence Service is initialized on another Server, it too may create a configured number of transaction context instances. In this fashion each Persistence Service may be guaranteed to have a unique set of contexts. The Persistence Service may create instances of transaction context and may persist them via JPA. Since this is a sequenced entity and the sequence is the context ID the transaction context instances created may be automatically unique. Each transaction context created may get the next sequence number. When a Persistence Service is shutdown it may delete the transaction context instances that it created. In some cases, this may remove them from the database.

In some examples, DataObject operations (e.g., all or some DataObject operations) may ultimately be made through an EJB method (e.g., called processDataObjectOperations). This method may take a collection of DataObjectOperations of which there is a derivation for insert, update, upsert, and/or delete. Each DataObjectOperations may specify a target DataObject by name, a particular operation, and the required data for that operation. The DataObjectOperations can contain any combination of DataObjectOperation targeting and/or any number of DataObjects. The DataObjectOperation may be executed in the order in which they were added to the DataObjectOperations. The processDataObjectOperations method may be defined as TransactionAttributeType.REQUIRED which means that if called within a JTA transaction, it may participate in that transaction. However, if called outside a JTA transaction, the application server may start a JTA transaction for the duration of the method call. In some instances, this means that processDataObjectOperations may always be operating within a JTA transaction. Additionally, all or some operations against a DataObject may occur within a JTA transaction.

In some examples, eliminating double counting of change events may be enabled by the following operations (which may be performed in any appropriate order, as desired. For example, when processDataObjectOperations are called (while the following operations are numbered, these numbers are merely to aid in explanation and shall not limit the set of operations to any particular order or to any operation being required):

1. An attempt may be made to fetch the transaction context from the associated JTA transaction. If there is an associated transaction context then it may be used. However, if there is no transaction context associated then:
   a) An exclusive lock may be obtained on a transaction context instance from the set of available transaction context instances (pool) created by the Persistence Service on startup. If a transaction context is not available the call may be blocked until a transaction context becomes available. This locking may be done in Java and/or in the database.
   b) The transaction ID in this transaction context may be incremented to the next number in sequence which may become the transaction ID for the associated JTA transaction.
   c) The transaction context instance may be "attached" to the JTA transaction as an application resource. This may allow the Persistence Service to obtain the transaction context from its associated JTA transaction (e.g., as in operation #1 above) should multiple calls be made within that one JTA transaction. This may assure that the same transaction context may be used for the operations performed within the same JTA transaction regardless if that JTA transaction was started from within or without the BEAM Server.
   d) The transaction context instance may be added as a transaction synchronization listener to the associated JTA transaction. This may allow the Persistence Service to be informed when the JTA transaction completes so it can take appropriate action.
   e) The transaction context entity with the incremented transaction ID may be merged. In some examples, this database update may also be happening within the associated JTA transaction.
2. The specified DataObject operations may be performed. Change notifications triggered may be tagged with the context ID and transaction ID from the transaction context.
3. The processDataObjectOperations method call may complete.
4. Should additional calls be made within the same JTA transaction, operation #1 above may pick up the "attached" transaction context and proceed to operation #2.
5. In some cases, if the JTA transaction commits:
   a) DataObject operations performed may be committed to the database.
   b) DataObject change notifications may be sent (JMS).

c) The transaction context merge may be committed.
d) Persistence may be notified that the transaction has completed and may release the transaction context back to the pool for use by a subsequent transaction. In some aspects, this may occur at some point in time after the commit.
6. In some cases, if the JTA transaction rolls back:
a) DataObject operations performed may be rolled back.
b) DataObject change notifications may be discarded (JMS).
c) The BeamTransactionContext merge may be rolled back.
d) Persistence may be notified that the transaction has completed so it may release the transaction context back to the pool for use by a subsequent transaction. In some aspects, this may happen after roll back.

In some example, when executing a query to obtain the initial state from the DataObject backing store they query may be executed atomically to also include UNION in the transaction context table. In this fashion query results plus the highest committed transaction ID for each BEAM context for all the data in our query result may be received. The transaction context information allows any DataObject change notifications to be checked to eliminate double-counting by checking the IDs in the change notification against the IDs in the transaction context table. Alternatively, or in addition, snapshot information at the querying instant may also be derived from the transaction context table. This snapshot information may be maintained in the CQL Engine and a snapshotID (increasing identifier) may be associated with it. The same may be set in the input queues of some selected operators in that query's plan. These are called 'connector' operators and they may represent the place at which a local query plan may join the global (overall) query plan. When an event arrives in CQL Engine, a snapshotID may be computed for that event using the context ID and transaction ID values in it. The snapshotID may be computed using the snapshot information maintained in CQL Engine. The snapshotID of the event may then be compared with the snapshotID of the input queue. If the ID in the event>ID in the queue then it may be processed otherwise it may have already been accounted for before and may therefore ignored to avoid double-counting.

In some examples, the persistence layer may supply a context ID (worker identifier) and a transaction ID (transaction identifier) with each change event notification and/or the persistence layer may maintain the transaction context table. Additionally, at query start time, the CQL Engine may query the 'snapshot' information (worker identifier, transaction identifier pairs) from the transaction context table and associate an increasing snapshot ID with it. The CQL Engine may also set the snapshot ID at the input queue of the "connector" operator at start time. Additionally, at query run time, the CQL Engine may use the worker identifier and/or transaction identifier fields in the input event and the maintained "snapshot" information to compute a Snapshot Id for each input event. At query runtime, the CQL Engine may also compare the snapshot ID of the input event and the one set in the input queue (at query start) to decide whether to process or ignore an event. The following is an example of general form of a DDL for worker and transaction ID clauses:

```
CREATE ARCHIVED RELATION <relation_name> (schema)
ARCHIVER <archiver_name> ENTITY "entity_name"
EVENT IDENTIFIER <col_name> WORKER IDENTIFIER
```

```
<col_name>
TRANSACTION IDENTIFIER <col_name> IS SYSTEM
TIMESTAMPED
```

In some examples, an Archiver may be maintained by the CQ Service; an Entity may be the name of the Data Object as a quoted string; the Event ID may be a column of type long which may act as a unique event ID column for this relation; the Worker ID may be a column of type long which may map to the context ID column in persistence generated change notification; and the Transaction ID may be a column of type long which may map to the transaction ID column in persistence generated change notification. The following is an example implementation:

```
CREATE ARCHIVED RELATION sales_info (prodid integer,
sales double, eid bigint, wid bigint, tid bigint) ARCHIVER myArchiver
ENTITY "sales_do" EVENT IDENTIFIER eid
WORKER IDENTIFIER wid TRANSACTION IDENTIFIER tid IS
SYSTEM TIMESTAMPED
```

Similarly, in some examples, these two clauses may be added after a REPLAY clause for archived streams.

As previously mentioned, there may be no need to actually tag each DataObject instance with the last context and transaction ID that modified it. In some examples, this information can be received instead from the transaction context entity. One way to accomplish this, as stated previously, is to atomically query both the desired data from the DataObject(s) as well as the contents of the transaction context entity. For atomicity, this may be performed using only one query. For example, using the UNION clause which allows the resultset from two disparate queries to be appended in a single query. In some examples, the DataObject(s) and/or the Persistence service described above may be embodied by the data store 166 of FIG. 1.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
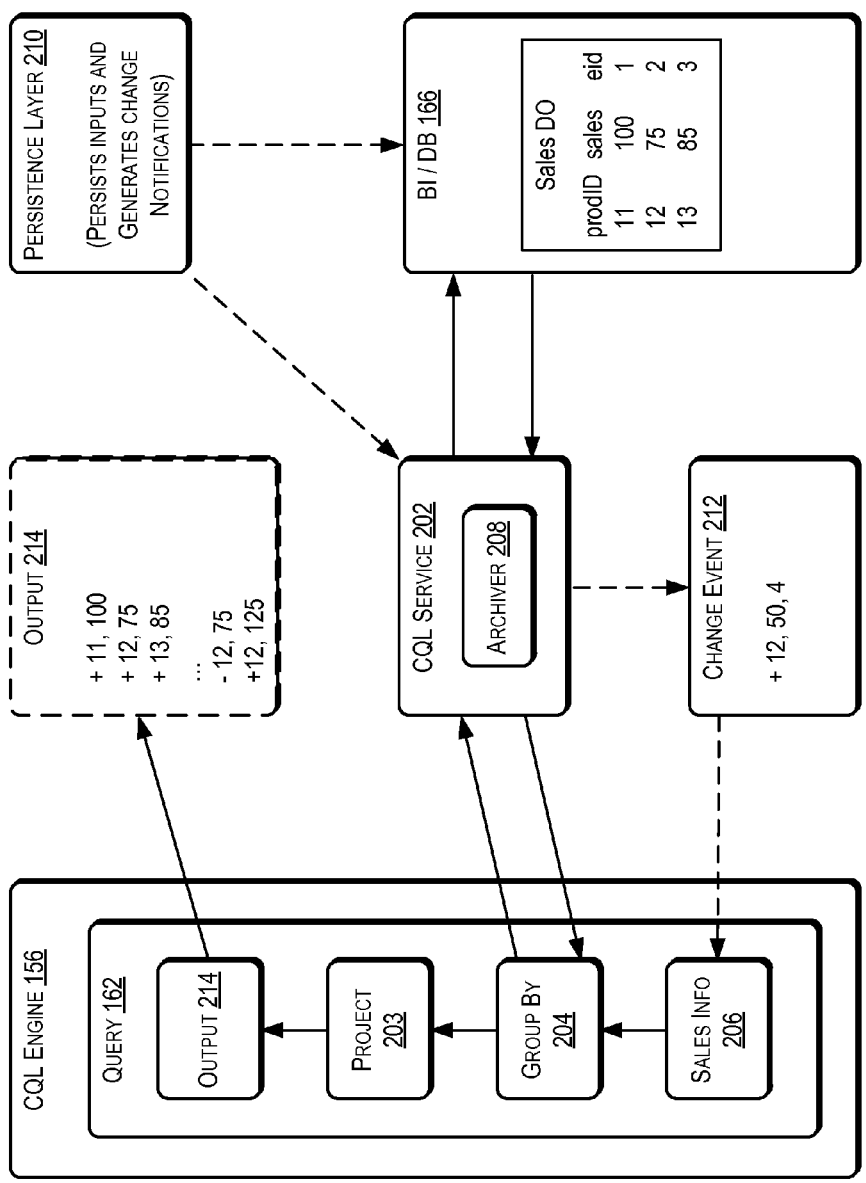
FIG. 2 is a simplified block diagram illustrating at least some features of the management of continuous queries with archived relations described herein, according to at least one example.

FIG. 2 illustrates a simplified block diagram 200 with which features for the management of continuous queries with archived relations may be described. As noted above, in some examples, archived relations, configurable archived relation windows, and/or change event counting may be described herein. As shown, FIG. 2 describes at least one implementation of a CQL Engine 156 and/or CQ Service 202 for managing archived relations (e.g., associated with a project 203). In some examples, when a query (e.g., a continuous query) 162 is identified that includes an archived relation (e.g., if a Group By operator 204 and/or a Sales Info operator 206, associated with the project 203, references an archived relation as opposed to a stream or historical data), the CQL engine 156 may parse that query 162 and send it to the archiver 208 in CQ Service 202. Additionally, in some examples, the CQL engine 156 may identify the GroupAggr (or Group By 204) operator as the query operator in this case and may construct the archiver query for that operator. This archiver query may then be sent to the archiver 208. In some cases, at that point, the CQ Service 202 may go out and get the snapshot (e.g., from the durable data store 166 and/or from a BI server). And, although the Persistence Layer (which include the BI/DB) 210 may have thousands or more entries, the CQ Service 202 may only retrieve the sum of the products (e.g., because of the Group By operator 204). As such, the CQL Engine 156 may receive the change events 212 as well as the historical data 166. The output 214 may then reflect the original historical data from the data store 166 plus the changes events 212 retrieved. In some examples, upon receiving a −12, 75 change event, the +12, 125 may reflect the updated sum value in the Output 214. The dashed arrows connecting the CQL Service 202 to the change event 212 indicates that the CQL Service 202 may send the change events to the CQL Engine 156 after receiving it from the persistence layer 210. The upwards-pointing arrows in query 162 are intended to indicate the flow of events in a query plan associated with the query 162.

Figure 3:
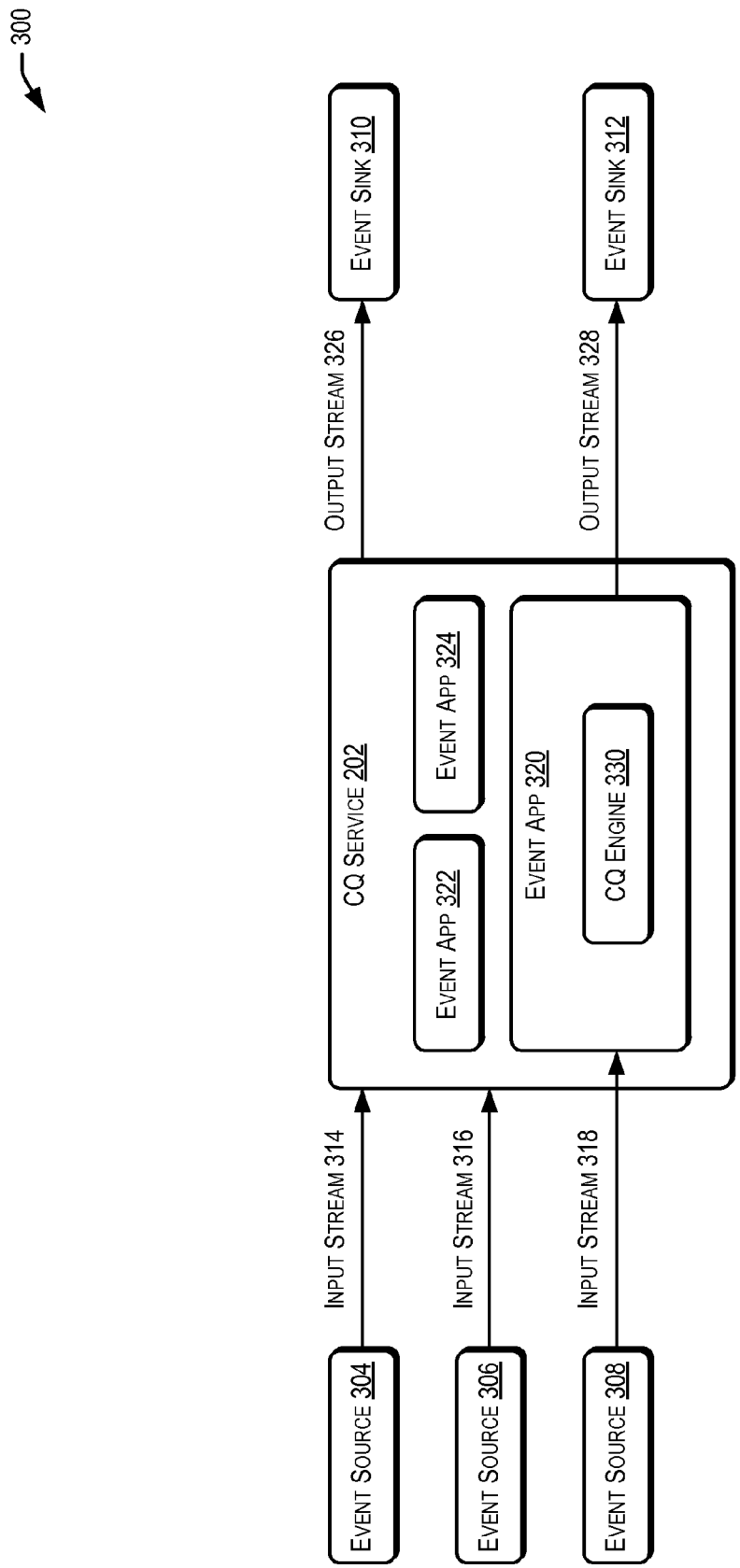
FIG. 3 is a simplified block diagram illustrating at least some additional features of the management of continuous queries with archived relations described herein, according to at least one example.

FIG. 3 depicts a simplified high level diagram of an event processing system 300 that may incorporate an embodiment of the present disclosure. Event processing system 300 may comprise one or more event sources (304, 306, 308), a CQ Service 202 that is configured to provide an environment for processing event streams, and one or more event sinks (310, 312). The event sources generate event streams that are received by the CQ Service 202. The CQ Service 202 may receive one or more event streams from one or more event sources. For example, as shown in FIG. 3, the CQ Service 202 receives an input event stream 314 from event source 304, a second input event stream 316 from event source 306, and a third event stream 318 from event source 308. One or more event processing applications (320, 322, and 324) may be deployed on and be executed by the CQ Service 202. An event processing application executed by the CQ Service 202 may be configured to listen to one or more input event streams, process the events received via the one or more event streams based upon processing logic that selects one or more events from the input event streams as notable events. The notable events may then be sent to one or more event sinks (310, 312) in the form of one or more output event streams. For example, in FIG. 3, the CQ Service 202 outputs an output event stream 326 to event sink 310, and a second output event stream 328 to event sink 312. In certain embodiments, event sources, event processing applications, and event sinks are decoupled from each other such that one can add or remove any of these components without causing changes to the other components.

In one embodiment, the CQ Service 202 may be implemented as a Java server comprising a lightweight Java application container, such as one based upon Equinox OSGi, with shared services. In some embodiments, the CQ Service 202 may support ultra-high throughput and microsecond latency for processing events, for example, by using JRockit Real Time. The CQ Service 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 3 provides a drilldown for one such event processing application 320. As shown in FIG. 3, event processing application 320 is configured to listen to input event stream 318, execute a query 330 comprising logic for selecting one or more notable events from input event stream 318, and output the selected notable events via output event stream 328 to event sink 312. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 320 in FIG. 3 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by the CQ Service 202 without having to store all the received events data. Accordingly, the CQ Service 202 provides a special querying mechanism that enables processing of events to be performed as the events are received by the CQ Service 202 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with the CQ Service 202 for a particular event stream may be executed each time that an event is received in that event stream. As part of the continuous query execution, the CQ Service 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:
(1) One or more adapters that interface directly to the input and output stream and relation sources and sinks Adapters are configured to understand the input and output stream protocol, and are responsible for converting the event data into a normalized form that can be queried by an application processor. Adapters may forward the normalized event data into channels or output streams and relation sinks Event adapters may be defined for a variety of data sources and sinks.
(2) One or more channels that act as event processing endpoints. Among other things, channels are responsible for queuing event data until the event processing agent can act upon it.
(3) One or more application processors (or event processing agents) are configured to consume normalized event data from a channel, process it using queries to select notable events, and forward (or copy) the selected notable events to an output channel.
(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.
(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 300 depicted in FIG. 3 may have other components than those depicted in FIG. 3. Further, the embodiment shown in FIG. 3 is only one example of a system that may incorporate an embodiment of the present disclosure. In some other embodiments, system 300 may have more or fewer components than shown in FIG. 3, may combine two or more components, or may have a different configuration or arrangement of components. System 300 can be of various types including a personal computer, a portable device (e.g., a mobile telephone or device), a workstation, a network computer, a mainframe, a kiosk, a server, or any other data processing system. In some other embodiments, system 300 may be configured as a distributed system where one or more components of system 300 are distributed across one or more networks in the cloud.

The one or more of the components depicted in FIG. 3 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 4:
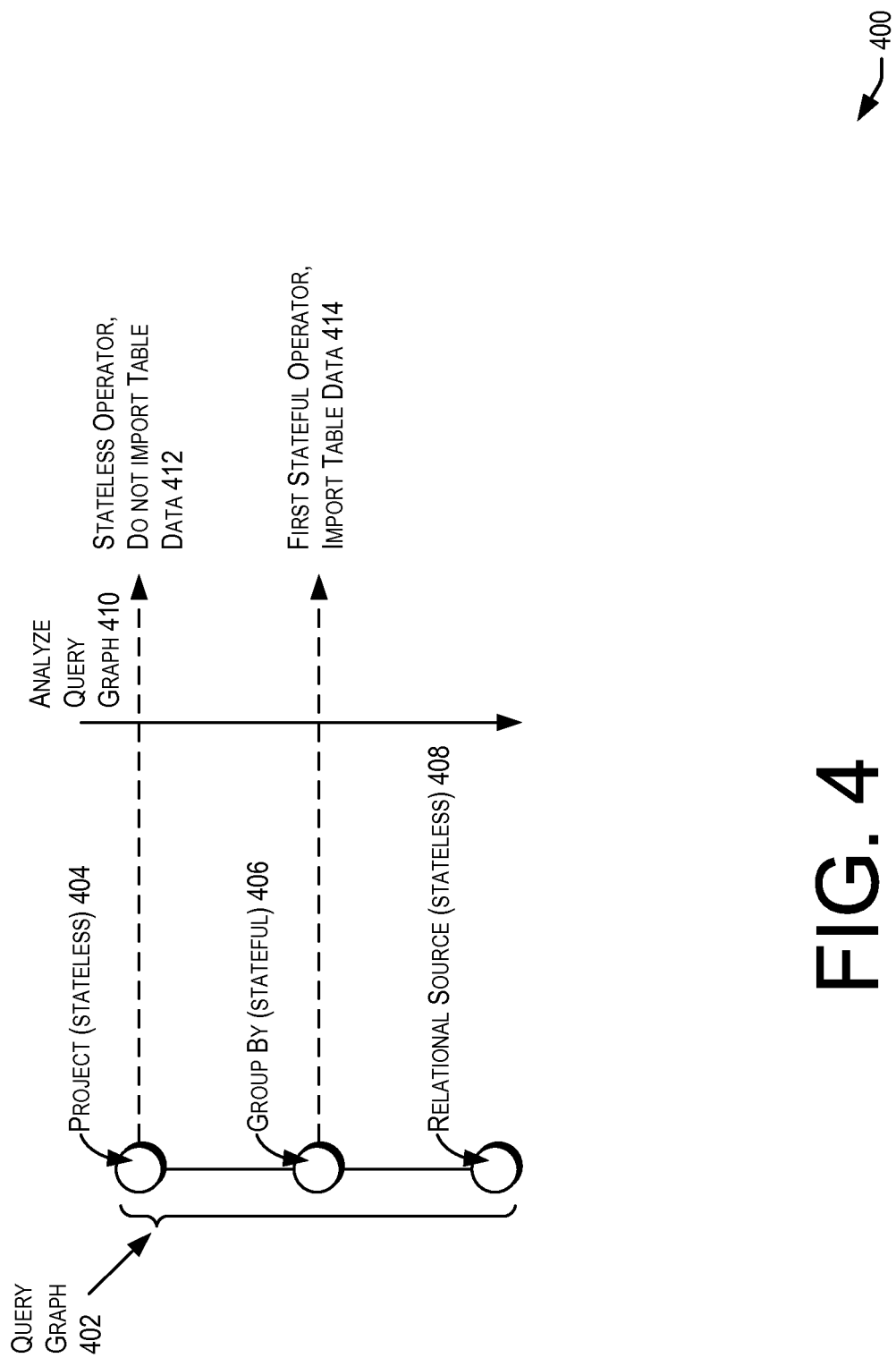
FIG. 4 is a simplified block diagram illustrating at least some additional features of the management of continuous queries with archived relations described herein, according to at least one example.

FIG. 4 illustrates a simplified block diagram 400 with which features of the management of archived relations may be described. As shown in FIG. 4, an archived relation may be represented as a query graph 402. In some examples, a query graph 402 may include nodes that represent operators of the query and vertices that represent a path between the operators of the query graph 402. In one non-limiting example, the query graph 402 of FIG. 4 includes a Project operator 404, a Group By operator 406, and a Relational Source operator 408. Further, in some examples, the Project operator 404 and the Relational Source 408 may be stateless, while the Group By operator 406 may be stateful. In some cases, stateless operators do not keep track of, manage, or otherwise request state, while stateful operators do. As noted above, in some instances, the query graph 402 may be analyzed or otherwise evaluated 410 in a top down fashion, importing historical data at stateful operators (in some examples, at the first or lowest stateful operator). While analyzing 410 the query graph 402, a service and/or engine (e.g., the CQ Service 202 and/or CQL engine 156 as described with reference to FIGS. 1-3) may be configured to determine the first stateful operator in the query graph 402. In the example of FIG. 4, the first stateful operator is Group By 406. As such, when the service reaches the Project operator 404 (which is stateless in this example), table data (i.e., historical data) may not be imported at 412. However, at 414, when the Group By operator 406 is reached, the historical, warehouse, and/or table data may be imported to initialize the archived relation.

Alternatively, or in addition, in some examples, the query graph 402 (also referred to as a plan) may be traversed in topological order starting from the source (here, the Relational Source operator 408). As such, in this example, the traversal may be in a bottom up fashion. In this traversing when the first stateful operator is reached, it may be marked as query operator and then the graph 402 may not need to be traversed further in that branch. Note that for some CQL queries like aggregate distinct, the query plan may have more than one branch. In the current example, Relational Source 408 may be stateless so the traversal may move up and see Group By 406. Since Group By 406 may be stateful it may be marked as the query operator. As such, the traversal may be complete, and may not need to go up to the Project operator 404 since Group By 406 would query the archiver, populate its state, and also propagate the snapshot output to Project 404, and further to downstream operators if any.

FIG. 5 illustrates at least one non-limiting example 500 for counting change events associated with archived relations utilizing one or more table IDs such as, but not limited to, a TRANSACTION_CID and/or a TRANSACTION_TID (as described above). As show in FIG. 5, an initial Transaction Context Table 502 and a Transaction Context Table after Insert 504 are shown. In some examples, a server configured to manage the transaction IDs may be initialized or otherwise started. When a Persistence Service is started by this server it may create a set of Transaction instances. As such, the Transaction Context Table 502 illustrates the contents of the after a single Persistence Service is started which created 10 context instances for its own use. The TRANSACTION_CID column contains the context ID and the TRANSACTION_TID column contains the highest transaction ID committed by that context ID.

In one non-limiting example, if a second Persistence Service started at this point, that also created 10 context instances for its own use, the Table 02 may illustrate 10 new entries with TRANSACTION_CID values of 11-20. Now that the Persistence Service is running a DataObject named "Alpha" containing one of each of the DataObject column data types may be created. In some examples, whenever a DataObject is created the Persistence Service may create a corresponding database View representing the persistent store for that DataObject. In one example, once the DataObject is generated, insert commands may be performed against it. In order to best illustrate the processing of context and transaction IDs, two insert operations per thread using 12 threads for a total of 24 inserts may be performed. Each thread may start a JTA transaction, perform one insert operation, perform a second insert operation and then commit the transaction. The reason for using multiple threads is that it may create multiple JTA transactions executing in parallel which will better illustrate how the context ID comes into play. This also demonstrates the scenario where multiple (two per thread in this example) DataObject operation method calls are made within the same JTA transaction and where that JTA transaction was started and committed outside of Persistence.

For this example, 12 threads may be running the code simultaneously. Each thread may start a transaction outside of the server, make two insert calls to Persistence and then commit the transaction. Since Persistence has allocated 10 context IDs, 10 of these threads may obtain a context while 2 may initially be blocked. Two JTA transactions may be blocked until another JTA transaction completes and releases the context. The blocked JTA transaction may then grab the released context and process the Persistence API call. In some examples, after the insert operations are completed an examination of the Table 504 (after insert) shows this very result. Transaction contexts 1 and 2 show transaction ID 2 as the "last committed" transaction IDs while all other transaction contexts show transaction ID 1 as their last committed transaction.

In some examples, DataObject change notifications may be broadcast via JMS as a result of the insert operations performed in this example. Remember, two inserts were performed per JTA transaction and 12 transactions were executed for a total of 24 insert operations. Transaction contexts 1 and 2 were used for two transactions each so we should see 4 change notifications from contexts 1 and 2 having transaction ID 1 for two inserts and transaction ID 2 for the other two inserts. All other contexts were used for only one transaction and should have generated two inserts both with transaction ID 1.

Figure 6:
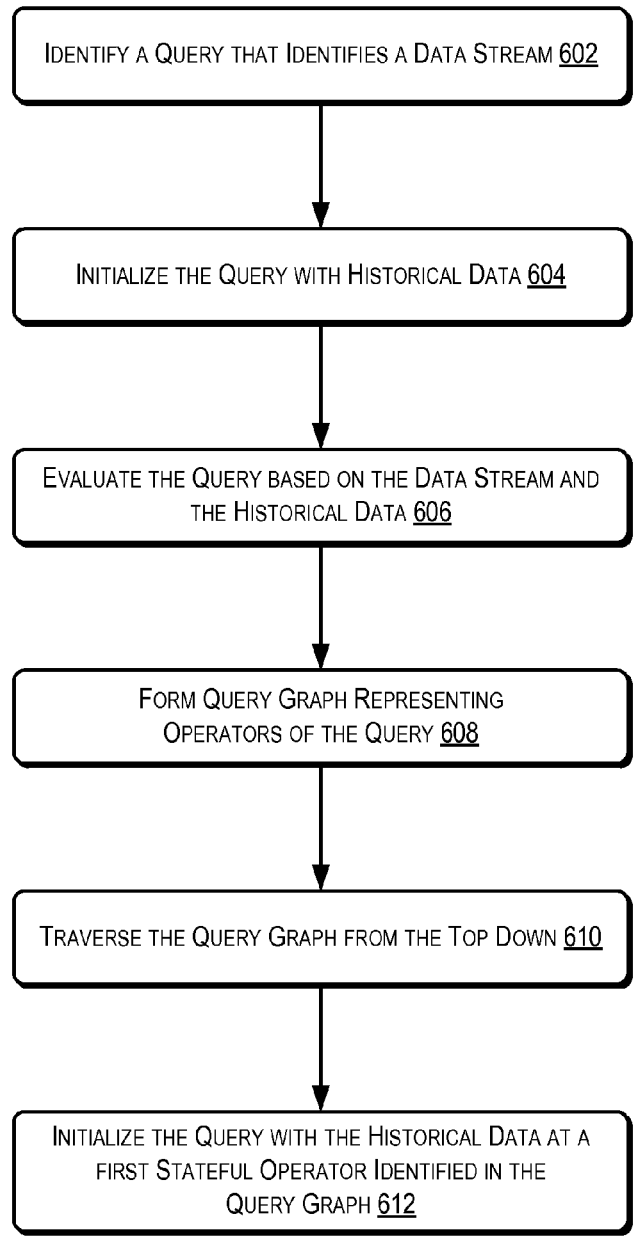
FIG. 6 is a simplified process flow illustrating at least some features of the management of continuous queries with archived relations described herein, according to at least one example.
Figure 7:
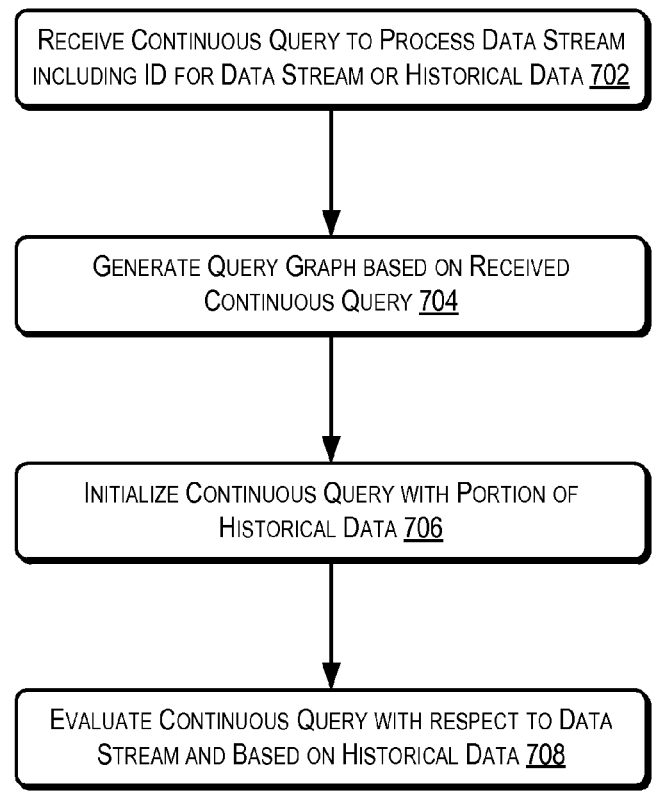
FIG. 7 is another simplified process flow illustrating at least some features of the management of continuous queries with archived relations described herein, according to at least one example.
Figure 8:
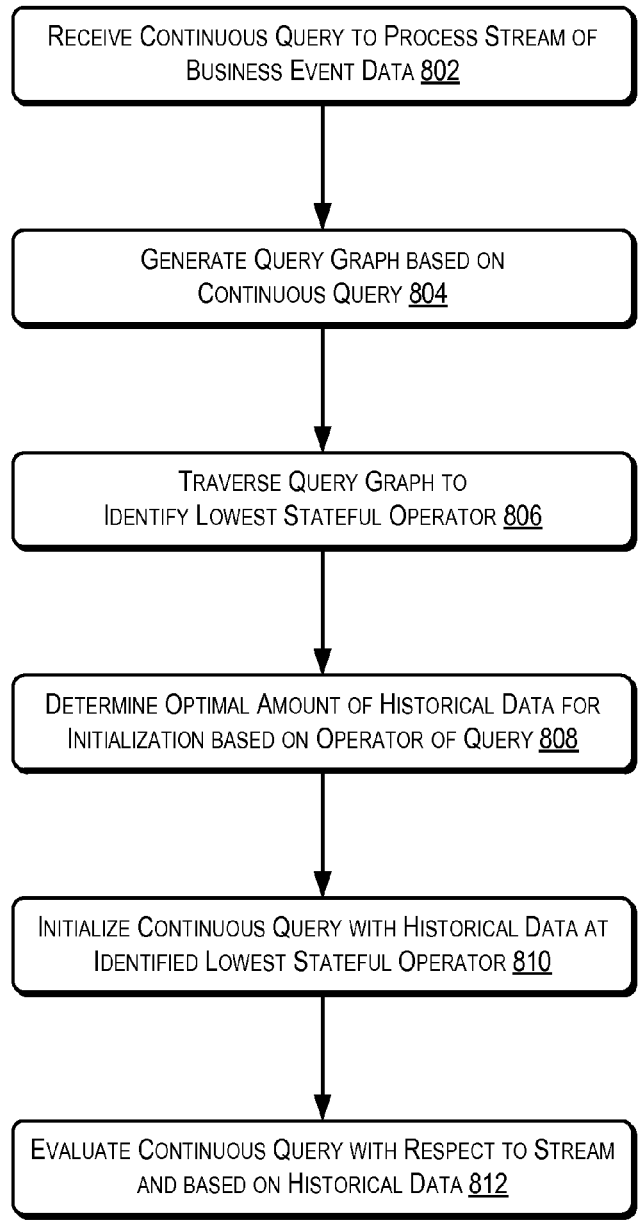
FIG. 8 is another simplified process flow illustrating at least some features of the management of continuous queries with archived relations described herein, according to at least one example.

FIGS. 6-8 illustrate example flow diagrams showing respective processes 600, 700, and 800 for implementing the management of continuous queries with archived relations described herein. These processes 600, 700, and 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the archived relation module 148) shown in at least FIG. 1 (and others) may perform the process 600 of FIG. 6. The process 600 may begin at 602 by including identifying and/or receiving a query that identifies a archived stream or archived relation as a data source. In some examples, at 604, the process 600 may include initializing the query with historical data. At 606, the process 600 may include evaluating the query based at least in part on the archived stream or archived relation and the historical data. At 608, the process 600 may also include forming a query graph representing operators of the query. The process 600 may include traversing the query graph from the top of the graph down at 610. Further, in some examples, the process 600 may end at 612 by including initializing the query with the historical data at a first stateful operator identified in the query graph.

FIG. 7 illustrates an example flow diagram showing process 700 for implementing the management of continuous queries with archived relations described herein. The one or more service provider computers 106 (e.g., utilizing at least the archived relation module 148) shown in at least FIG. 1 may perform the process 700 of FIG. 7. The process 700 may begin at 702 by including receiving a continuous query to process a data stream or an archived relation including an ID for a data stream or historical data. At 704, the process 700 may include generating a query graph based at least in part on the received continuous query. Additionally, in some examples, the process 700 may include initializing the continuous query with a portion of the historical data. Further, the process 700 may end, at 708, by including evaluating the continuous query with respect to the data stream or the archived relation and based at least in part on the historical data.

FIG. 8 illustrates an example flow diagram showing process 800 for implementing the management of continuous queries with archived relations described herein. The one or more service provider computers 106 (e.g., utilizing at least the archived relation module 148) shown in at least FIG. 1 may perform the process 800 of FIG. 8. The process 800 may begin at 802 by including receiving a continuous query to process a stream or archived relation associated with business event data. At 804, the process 800 may include generating a query graph based at least in part on the continuous query. At 806, the process 800 may include traversing the query graph topologically from the source to identify a lowest stateful operator (e.g., the lowest stateful operator may be the last stateful operator identified while traversing and/or it may be an operator of a branch). In some examples, at 808, the process 800 may include determining an optimal amount of historical data for initializing based at least in part on the operator of the query. At 810, the process 800 may include initializing the continuous query with historical data at an identified lowest stateful operator. Further, in some examples, the process 800 may end by including evaluating the continuous query with respect to the data stream or the archived relation based at least in part on historical data at 812.

Figure 9:
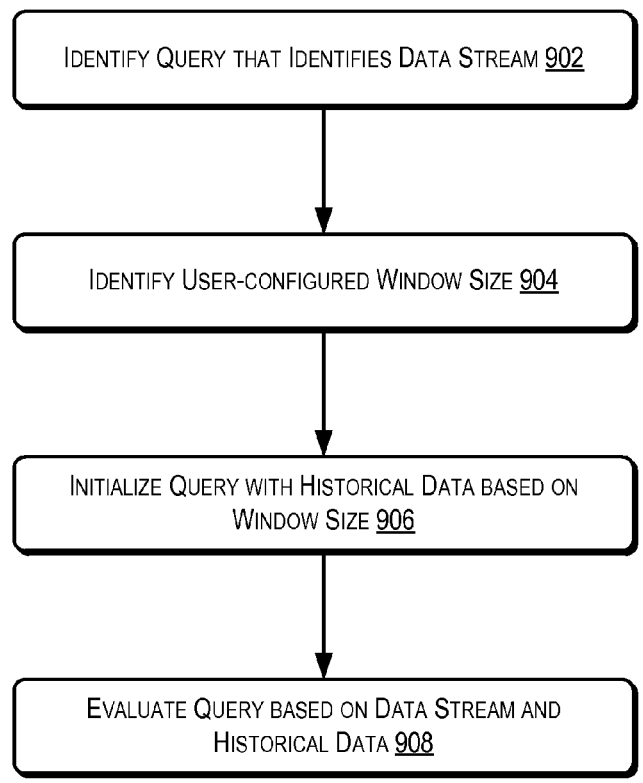
FIG. 9 is another simplified process flow illustrating at least some features of the management of continuous queries with archived relations described herein, according to at least one example.
Figure 10:
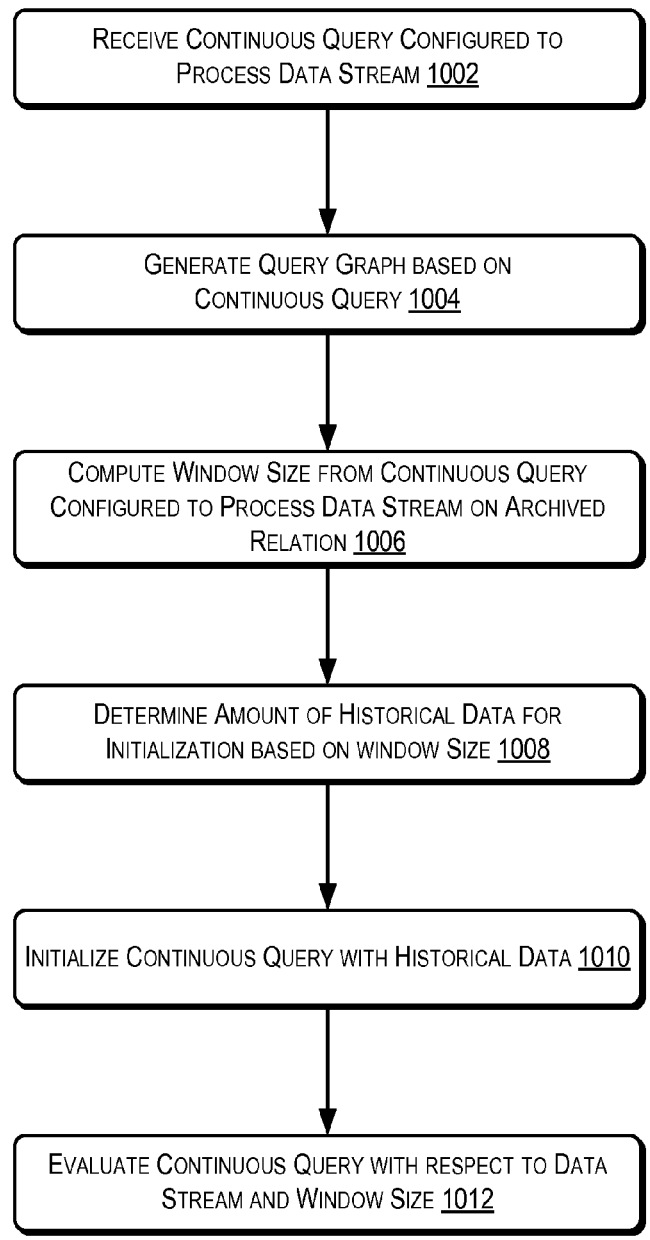
FIG. 10 is another simplified process flow illustrating at least some features of the management of continuous queries with archived relations described herein, according to at least one example.
Figure 11:
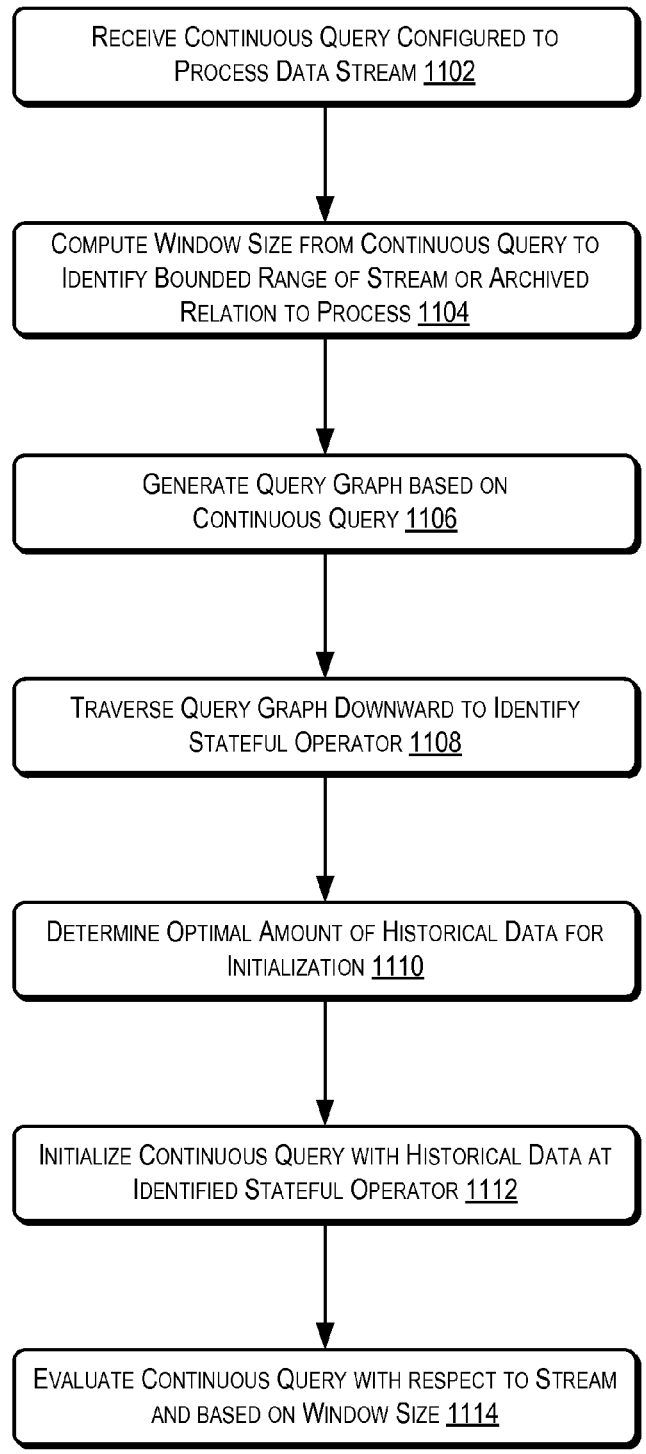
FIG. 11 is another simplified process flow illustrating at least some features of the management of continuous queries with archived relations described herein, according to at least one example.

FIGS. 9-11 illustrate example flow diagrams showing respective processes 900, 1000, and 1100 for implementing the archived relations with configurable data windows described herein. These processes 900, 1000, 1100 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the configurable window module 150) shown in at least FIG. 1 may perform the process 900 of FIG. 9. The process 900 may begin at 902 by including identifying or otherwise receiving a query that identifies a data stream or archived relation. At 904, the process 900 may include identifying a user-configured window size. At 906, the process 900 may include initializing the query with historical data based at least in part on the window size. Further, the process 900 may end at 908 by including evaluating the query based at least in part on the historical data as well as the archived stream or archived relation.

FIG. 10 illustrates an example flow diagram showing process 1000 for implementing the archived relations with configurable data windows described herein. The one or more service provider computers 106 (e.g., utilizing at least the configurable window module 150) shown in at least FIG. 1 may perform the process 1000 of FIG. 10. The process 1000 may begin at 1002 by including receiving a continuous query configured to process a data stream or an archived relation. At 1004, the process 1000 may include generating a query graph based at least in part on the continuous query. At 1006, the process 1000 may include computing the window size from the continuous query configured to process a data stream or an archived relation. In some examples, at 1008, the process 1000 may include determining an amount of historical data for initialization based at least in part on the window size. At 1010, the process 1000 may include initializing the continuous query with the determined historical data. Further, at 1012, the process 1000 may include evaluating the continuous query with respect to the archived stream or archived relation, and the window size.

FIG. 11 illustrates an example flow diagram showing process 1100 for implementing the archived relations with configurable data windows described herein. The one or more service provider computers 106 (e.g., utilizing at least the configurable window module 150) shown in at least FIG. 1 may perform the process 1100 of FIG. 11. The process 1100 may begin at 1102 by including receiving a continuous query configured to process a archived stream or archived relation. At 1104, may include computing the window size from continuous query to identify a bounded range of stream or archived relation to process. At 1106, the process 1100 may include generating a query graph based at least in part on the continuous query. Additionally, in some aspects, the process 1100 may include traversing the query graph downward (e.g., top down approach) in order to identify a stateful operator. At 1110, the process 1100 may include determining an optimal amount of historical data for initializing. At 1112, the process 1100 may include initializing the continuous query with historical data at an identified stateful operator. Further, in some examples, the process 1100 may include evaluating the continuous query with respect to the stream or archived relation, and based at least in part on the window size.

Figure 12:
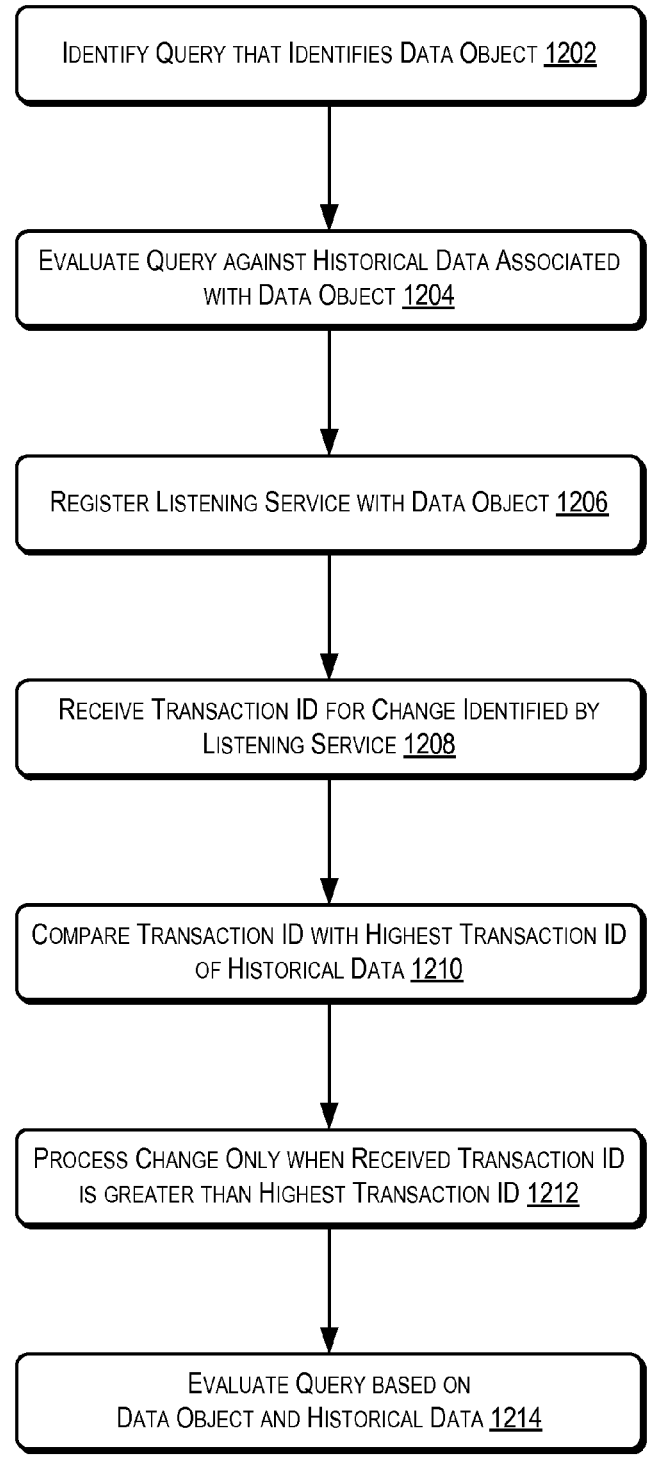
FIG. 12 is another simplified process flow illustrating at least some features of the management of continuous queries with archived relations described herein, according to at least one example.
Figure 13:
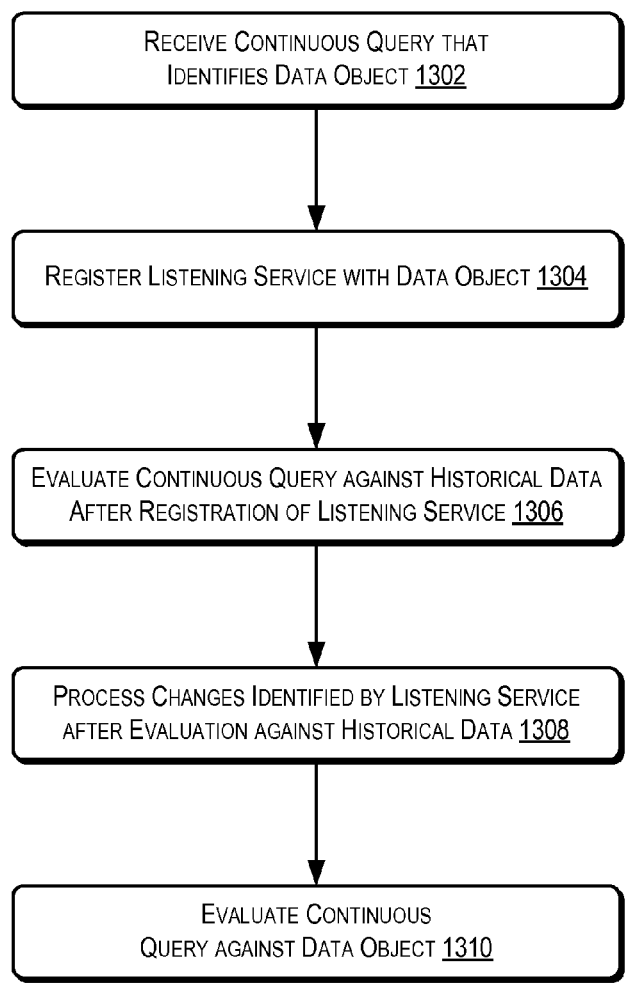
FIG. 13 is another simplified process flow illustrating at least some features of the management of continuous queries with archived relations described herein, according to at least one example.
Figure 14:
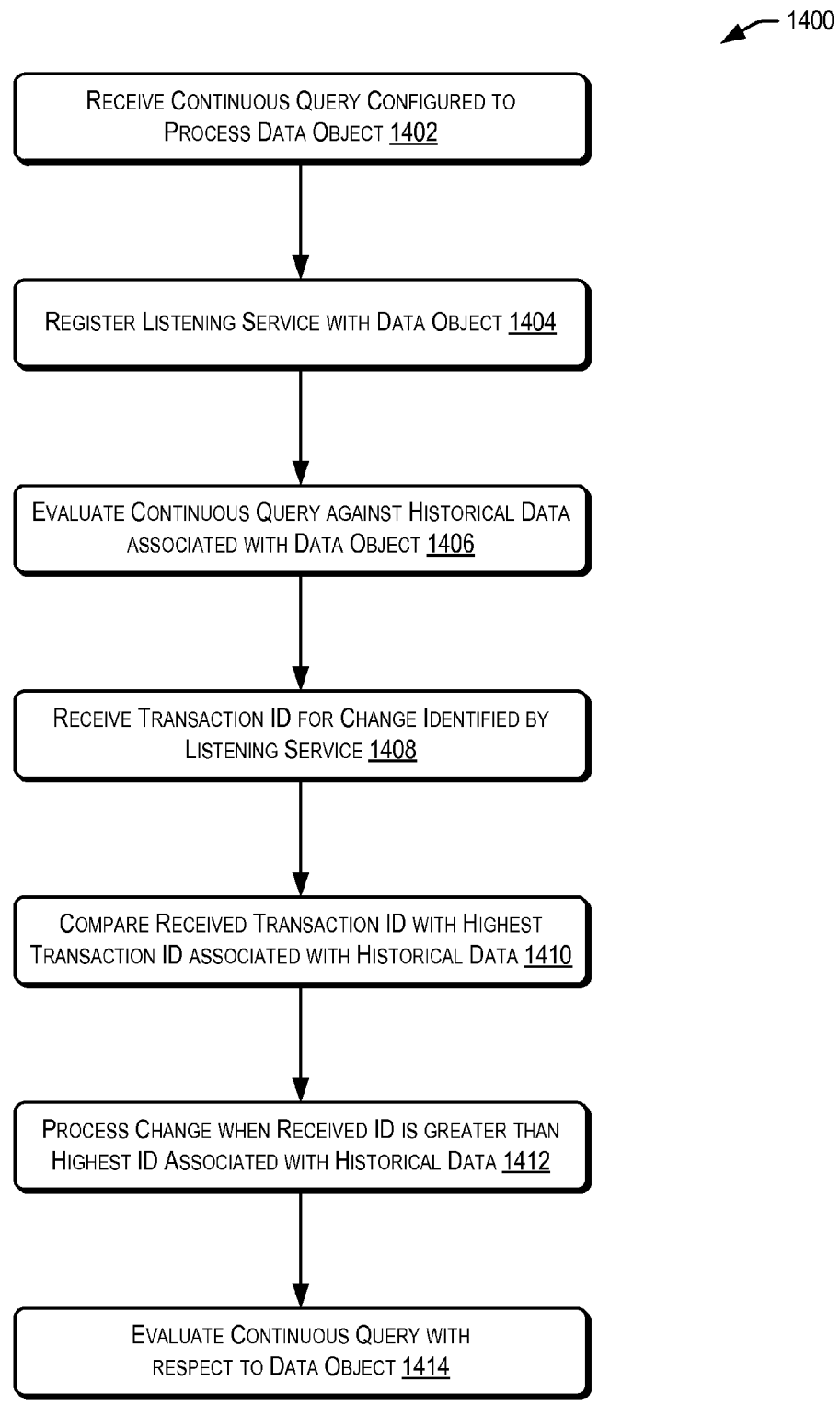
FIG. 14 is another simplified process flow illustrating at least some features of the management of continuous queries with archived relations described herein, according to at least one example.

FIGS. 12-14 illustrate example flow diagrams showing respective processes 1200, 1300, and 1400 for implementing the event counting features associated with archived relations described herein. These processes 1200, 1300, 1400 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the event counting module 152) shown in at least FIG. 1 may perform the process 1200 of FIG. 12. The process 1200 may begin at 1202 by including identifying a query that identifies a data object. At 1204, the process 1200 may include evaluating a query against historical data associated with the data object. At 1206, the process 1200 may include registering a listening service with the data object. The process 1200 may also include receiving a transaction ID for change identified by the listening service at 1208. In some examples, at 1210, the process 1200 may include comparing the transaction ID with a highest transaction ID of historical data. At 1212, the process 1200 may include processing the change only when the received transaction ID is greater than the highest transaction ID. At 1214, the process 1200 may end by including evaluating query based at least in part on the data object and historical data.

FIG. 13 illustrates an example flow diagram showing process 1300 for implementing the archived relations with configurable data windows described herein. The one or more service provider computers 106 (e.g., utilizing at least the event counting module 152) shown in at least FIG. 1 may perform the process 1300 of FIG. 13. The process 1300 may begin at 1302 by including receiving a continuous query that identifies or otherwise receives a data object. At 1304, the process 1300 may include registering a listening service associated with the data object. Additionally, in some examples, the process 1300 may include evaluating a continuous query against historical data after registration of the listening service at 1306. At 1308, the process 1300 may include processing changes identified by the listening service after evaluation against the historical data. At 1310, the process 1300 may end by including evaluating the continuous query against the data object.

FIG. 14 illustrates an example flow diagram showing process 1400 for implementing the archived relations with configurable data windows described herein. The one or more service provider computers 106 (e.g., utilizing at least the event counting module 152) shown in at least FIG. 1 may perform the process 1400 of FIG. 14. The process 1400 may begin at 1402 by including receiving a continuous query configured to process a data object. At 1404, the process 1400 may include registering a listening service with the data object. At 1406, the process 1400 may include evaluating the continuous query against historical data associated with the data object. In some examples, the process 1400 may also include receiving a transaction ID for changes identified by the listening service at 1408. Additionally, at 1410, the process 1400 may include comparing the received transaction ID with the highest transaction ID currently associated with the historical data. At 1412, the process 1400 may include processing changes when the received ID is greater than the highest ID associated with historical data. At 1414, the process 1400 may end by including evaluating the continuous query with respect to the data object.

Illustrative methods and systems for implementing the hybrid execution of continuous and scheduled queries are described above. Some or all of these systems and methods may, but need not, be implemented at least partially by architectures and processes such as those shown at least in FIGS. 1-14 above.

Figure 15:
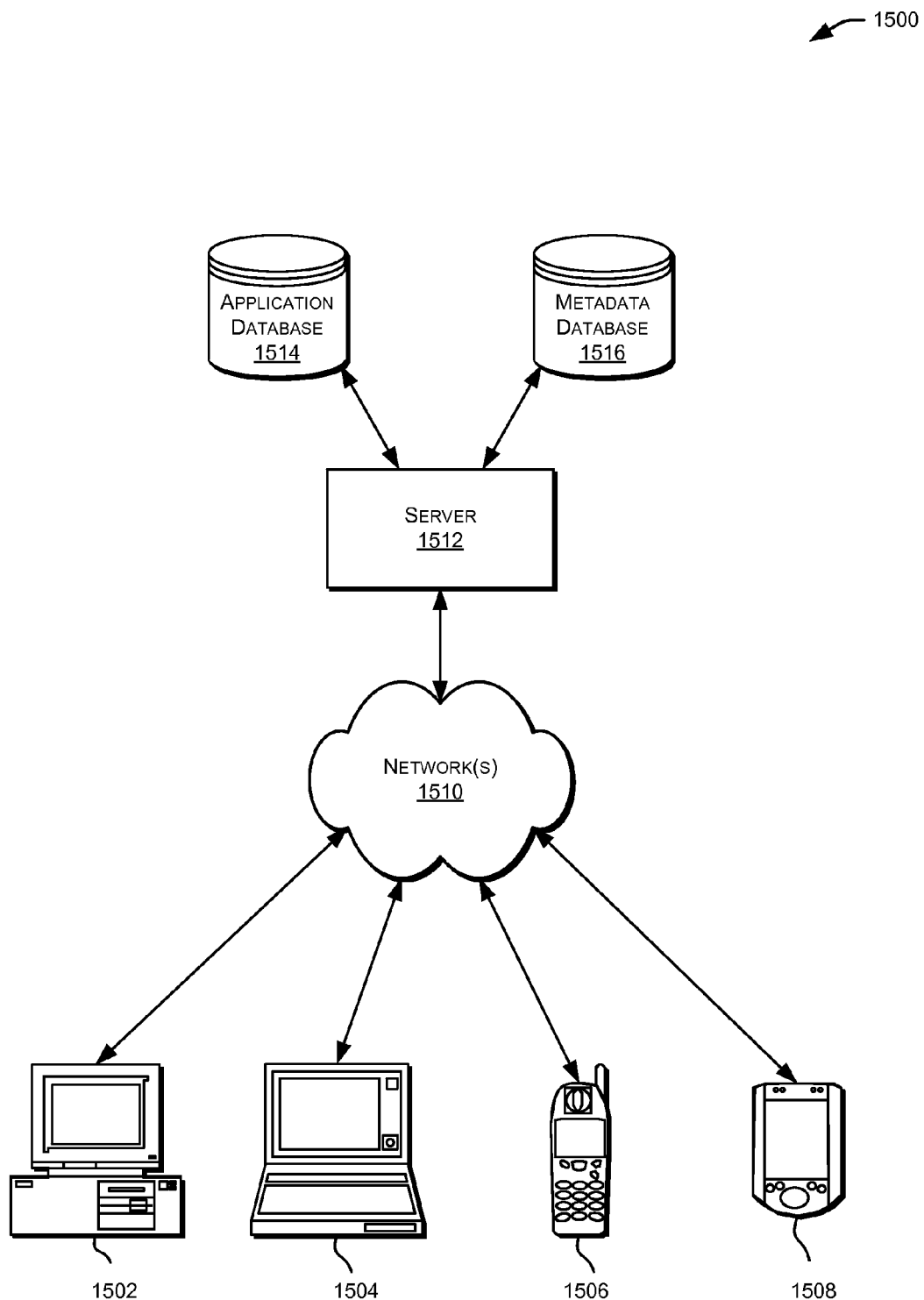
FIG. 15 is a simplified block diagram illustrating components of a system environment that may be used in accordance with an embodiment of the management of continuous queries with archived relations described herein, according to at least one example.

FIG. 15 is a simplified block diagram illustrating components of a system environment 1500 that may be used in accordance with an embodiment of the present disclosure. As shown, system environment 1500 includes one or more client computing devices 1502, 1504, 1506, 1508, which are configured to operate a client application such as a web browser, proprietary client (e.g., Oracle Forms), or the like over one or more networks 1510 (such as, but not limited to, networks similar to the networks 108 of FIGS. 1 and 3). In various embodiments, client computing devices 1502, 1504, 1506, and 1508 may interact with a server 1512 over the networks 1510.

Client computing devices 1502, 1504, 1506, 1508 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1502, 1504, 1506, and 1508 may be any other electronic device, such as a thin-client computer, Internet-enabled gaming system, and/or personal messaging device, capable of communicating over a network (e.g., network 1510 described below). Although exemplary system environment 1500 is shown with four client computing devices, any number of client computing devices may be supported. Other devices such as devices with sensors, etc. may interact with server 1512.

System environment 1500 may include networks 1510. Networks 1510 may be any type of network familiar to those skilled in the art that can support data communications using any of a variety of commercially-available protocols, including without limitation TCP/IP, SNA, IPX, AppleTalk, and the like. Merely by way of example, network 1510 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1500 also includes one or more server computers 1512 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1512 may be adapted to run one or more services or software applications described in the foregoing disclosure. For example, server 1512 may correspond to a server for performing processing described above according to an embodiment of the present disclosure.

Server 1512 may run an operating system including any of those discussed above, as well as any commercially available server operating system. Server 1512 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1500 may also include one or more databases 1514, 1516. Databases 1514, 1516 may reside in a variety of locations. By way of example, one or more of databases 1514, 1516 may reside on a non-transitory storage medium local to (and/or resident in) server 1512. Alternatively, databases 1514, 1516 may be remote from server 1512, and in communication with server 1512 via a network-based or dedicated connection. In one set of embodiments, databases 1514, 1516 may reside in a storage-area network (SAN) familiar to those skilled in the art. Similarly, any necessary files for performing the functions attributed to server 1512 may be stored locally on server 1512 and/or remotely, as appropriate. In one set of embodiments, databases 1514, 1516 may include relational databases, such as databases provided by Oracle, that are adapted to store, update, and retrieve data in response to SQL-formatted commands.

Figure 16:
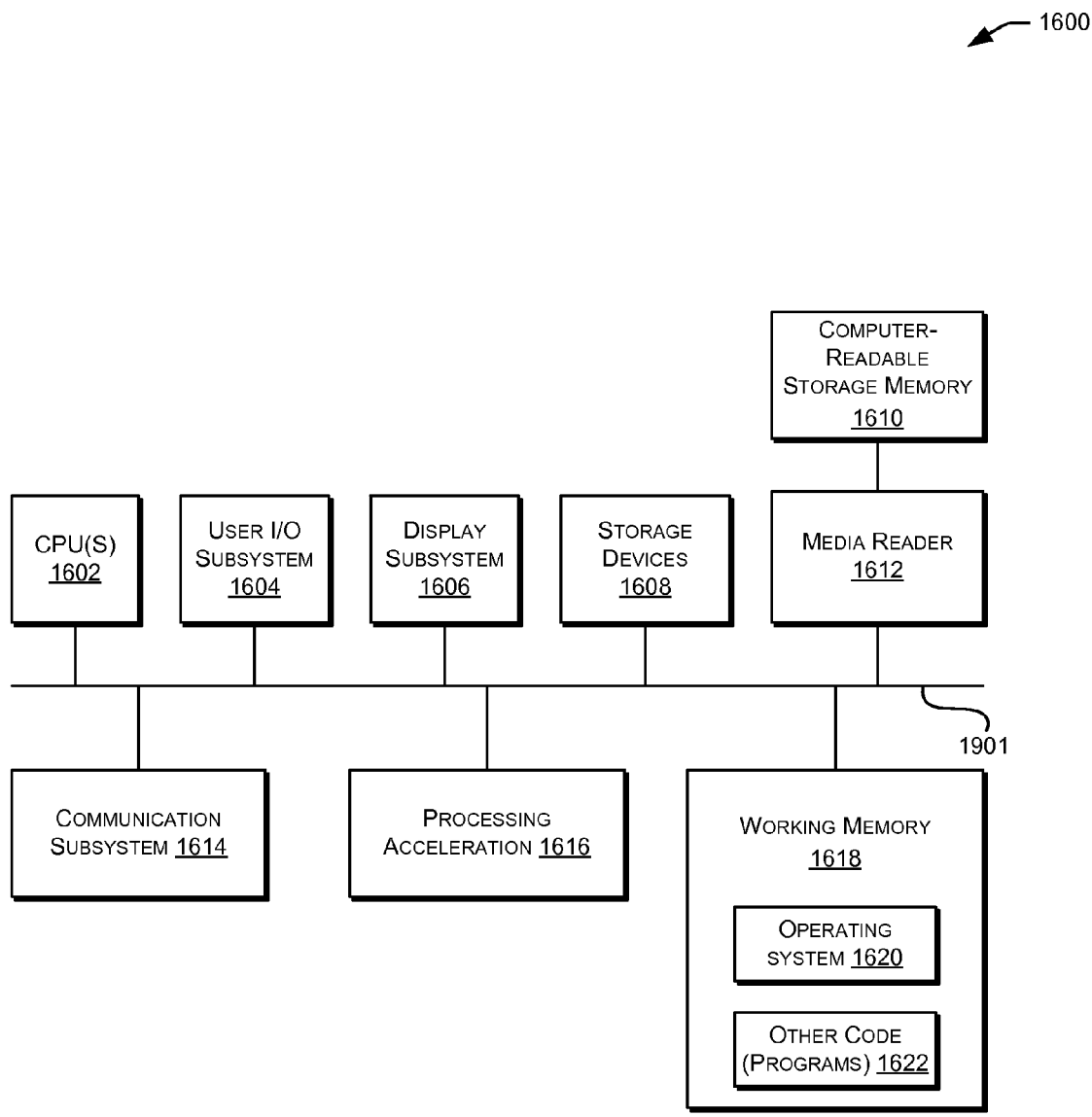
FIG. 16 is a simplified block diagram illustrating a computer system that may be used in accordance with embodiments of the management of continuous queries with archived relations described herein described herein, according to at least one example.

FIG. 16 is a simplified block diagram of a computer system 1600 that may be used in accordance with embodiments of the present disclosure. For example service provider computers 106 may be implemented using a system such as system 1600. Computer system 1600 is shown comprising hardware elements that may be electrically and/or communicatively coupled via a bus 1601. The hardware elements may include one or more central processing units (CPUs) 1602, one or more input devices 1604 (e.g., a mouse, a keyboard, etc.), and one or more output devices 1606 (e.g., a display device, a printer, etc.). Computer system 1600 may also include one or more storage devices 1608. By way of example, the storage device(s) 1608 may include devices such as disk drives, optical storage devices, and solid-state storage devices such as a random access memory (RAM) and/or a read-only memory (ROM), which can be programmable, flash-updateable and/or the like.

Computer system 1600 may additionally include a computer-readable storage media reader 1612, a communications subsystem 1614 (e.g., a modem, a network card (wireless or wired), an infra-red communication device, etc.), and working memory 1618, which may include RAM and ROM devices as described above. In some embodiments, computer system 1600 may also include a processing acceleration unit 1616, which can include a digital signal processor (DSP), a special-purpose processor, and/or the like.

Computer-readable storage media reader 1612 can further be connected to a computer-readable storage medium 1610, together (and, optionally, in combination with storage device(s) 1608) comprehensively representing remote, local, fixed, and/or removable storage devices plus storage media for temporarily and/or more permanently containing computer-readable information. Communications system 1614 may permit data to be exchanged with network 1612 and/or any other computer described above with respect to system environment 1600.

Computer system 1600 may also comprise software elements, shown as being currently located within working memory 1618, including an operating system 1620 and/or other code 1622, such as an application program (which may be a client application, Web browser, mid-tier application, RDBMS, etc.). In an exemplary embodiment, working memory 1618 may include executable code and associated data structures used for relying party and open authorization-related processing as described above. It should be appreciated that alternative embodiments of computer system 1600 may have numerous variations from that described above. For example, customized hardware might also be used and/or particular elements might be implemented in hardware, software (including portable software, such as applets), or both. Further, connection to other computing devices such as network input/output devices may be employed.

Figure 17:
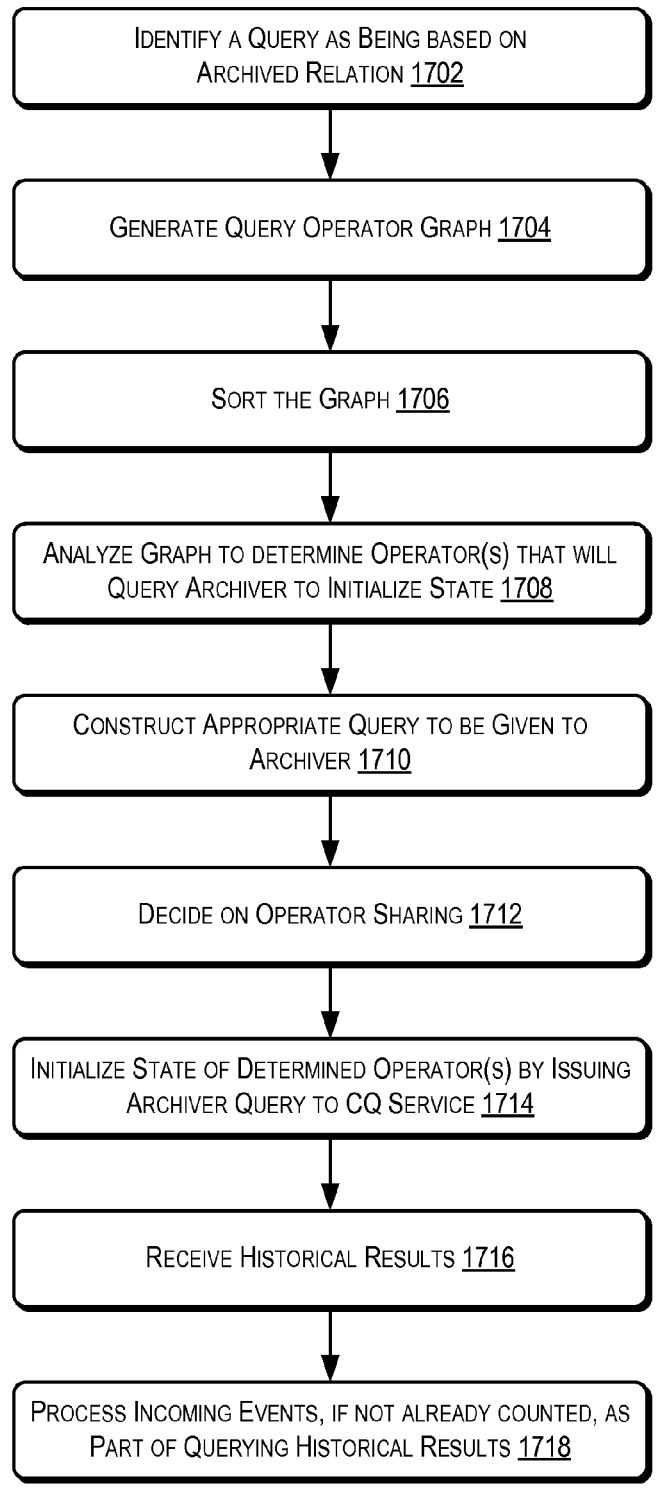
FIG. 17 is another simplified process flow illustrating at least some features of the management of continuous queries with archived relations described herein, according to at least one example.

FIG. 17 illustrates another example flow diagram showing process 1700 for implementing the management of continuous queries with archived relations described herein. The one or more service provider computers 106 (e.g., utilizing at least the archived relation module 148) shown in at least FIG. 1 may perform the process 1700 of FIG. 17. The process 1700 may begin at 1702 by including identifying a query as being based at least in part on an archived relation. At 1704, the process 1700 may include generating a query operator graph utilizing operators of the query. Additionally, in some examples, the process 1700 may include sorting the operator graph (e.g., topologically) at 1706. At 1708, the process 1700 may include analyzing the graph to determine operator(s) that may query the archiver to initialize the state (e.g., stateful operators). At 1710, the process 1700 may include constructing an appropriate query (e.g., an archiver query) to be given the archiver. In some examples, the process 1700 may also include deciding on operator sharing at 1712. At 1714, the process 1700 may include initializing the state of the determined operator(s) by issuing the archiver query to the CQ Service (e.g., as described above). At 1716, the process 1700 may receive historical results (e.g., from the CQ Service or persistence). Further, the process 1700 may end, at 1718, by including processing incoming events, if not already counted, as part of querying the historical results.

Figure 18:
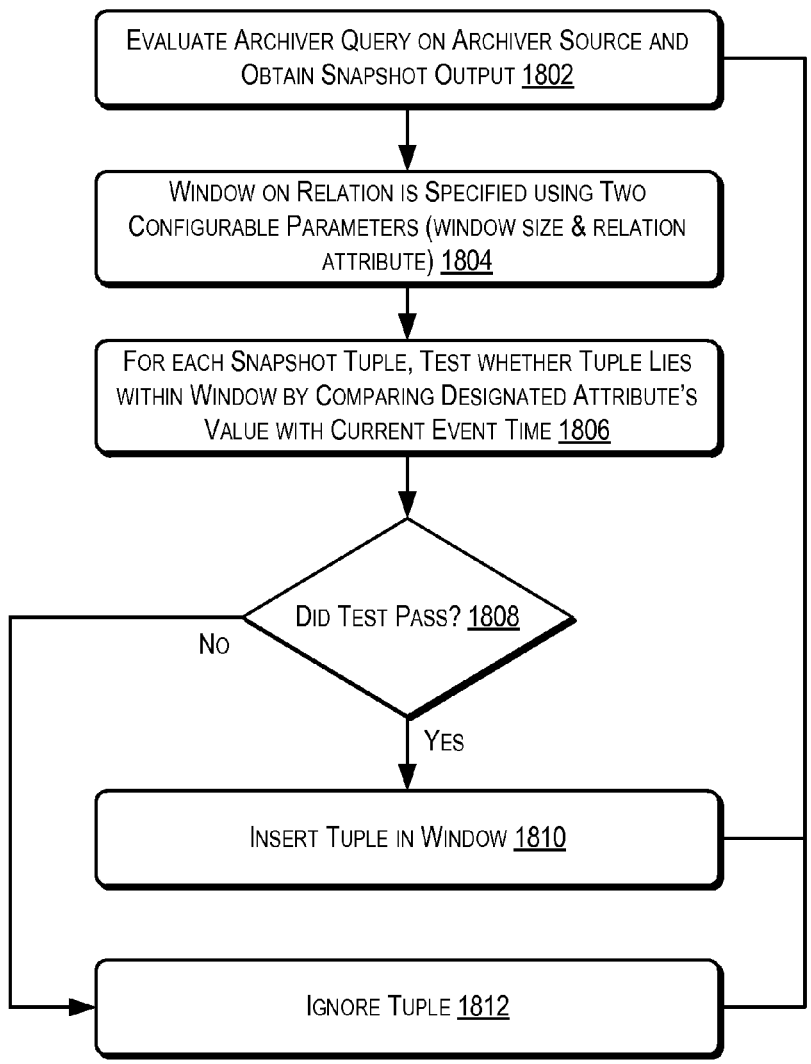
FIG. 18 is another simplified process flow illustrating at least some features of the management of continuous queries with archived relations described herein, according to at least one example.

FIG. 18 illustrates another example flow diagram showing process 1800 for implementing the management of continuous queries with archived relations described herein. The one or more service provider computers 106 (e.g., utilizing at least the configurable window module 150) shown in at least FIG. 1 may perform the process 1800 of FIG. 18. The process 1800 may begin at 1802 by including evaluating an archiver query on an archiver source and obtaining one or more snapshot outputs. At 1804, the process 1800 may include specifying a window on a relation utilizing at least one of two configurable parameters. The configurable parameters include window size and/or relation attribute). Additionally, in some examples, the process 1800 may include testing, for each snapshot tuple, whether the tuple lies within a window by comparing a designated attribute's value with a current event time at 1806. At 1808, the process 1800 may include determining whether the snapshot tuple passed the test. In some examples, if the test is passed, at 1810, the process 1800 may include inserting the tuple in the window. However, in some examples, if the test is not passed, the process 1800 may instead include ignoring the tuple at 1812. The process 1800 may then return to 1802 to end or to include evaluating the next archiver query.

Figure 19:
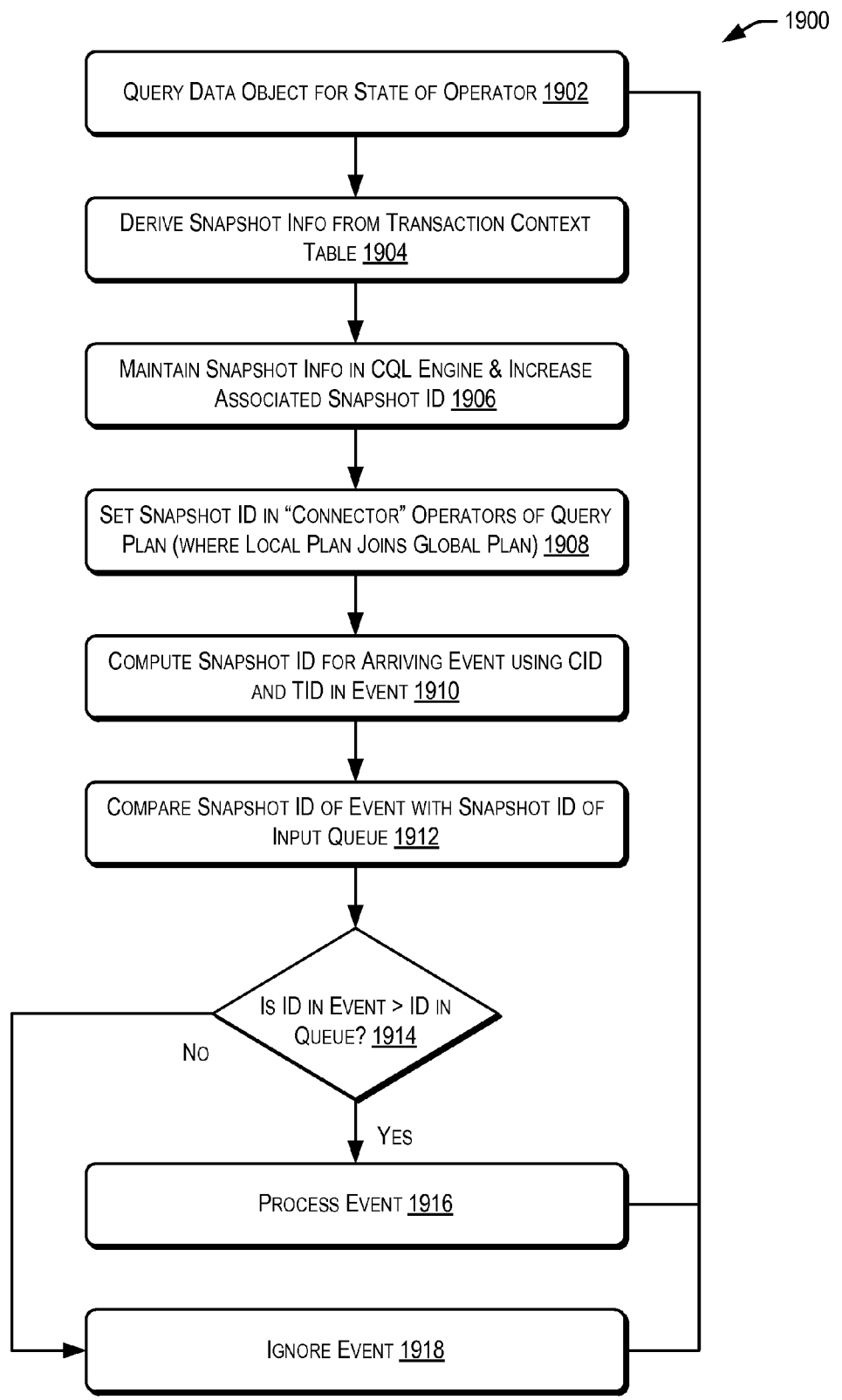
FIG. 19 is another simplified process flow illustrating at least some features of the management of continuous queries with archived relations described herein, according to at least one example.

FIG. 19 illustrates another example flow diagram showing process 1900 for implementing the management of continuous queries with archived relations described herein. The one or more service provider computers 106 (e.g., utilizing at least the event counting module 152) shown in at least FIG. 1 may perform the process 1900 of FIG. 19. The process 1900 may begin at 1902 by including querying a data object for a state operator. At 1904, the process 1900 may include deriving snapshot information from a transaction context table. At 1906, the process 1900 may include maintaining the snapshot information in a CQL Engine and increasing an associated snapshot ID. At 1908, the process 1900 may include setting a snapshot ID in a "connector" operator of the query plan. The "connector" operator may join local plans with global plans. At 1910, the process 1900 may include computing a snapshot ID for arriving events using the context ID (CID) and the transaction ID (TID) in the event. At 1912, the process 1900 may include comparing the snapshot ID of the event with the snapshot ID of an input queue. At 1914, the process 1900 may include determining whether the ID in the event is greater than the ID of the input queue. In some examples, if the event ID is greater than the queue ID, at 1914, the process 1900 may include processing the event. However, in some examples, if the event ID is not greater than the queue ID at 1914, the process 1900 may instead include ignoring the event at 1918. The process 1900 may then return to 1902 to end or to begin again.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
   a memory storing a plurality of instructions; and
   one or more processors that access the memory, wherein the one or more processors execute the plurality of instructions to at least:
      identify a continuous query that identifies a data stream;
      identify a configurable window size;
      generate an archived relation to include at least a portion of historical data and incoming events of the identified data stream that are within a window that corresponds to the configurable window size, the historical data from a previous time associated with the identified data stream;
      initialize the continuous query with the archived relation to process at least the portion of the historical data based at least in part on the window size; and
      evaluate the archived relation using the continuous query based at least in part on the data stream and the portion of the historical data.

2. The system of claim 1, wherein the continuous query processes incoming real-time business event data of the data stream.

3. The system of claim 1, wherein the evaluation of the archived relation includes at least applying the continuous query against the data stream based at least in part on the configurable window size.

4. The system of claim 1, wherein the data stream comprises a relation configured with a second configurable window size for referencing a portion of the data stream within a second window with a size based at least in part on a second configurable window size.

5. The system of claim 4, wherein the second window moves along the data stream with time.

6. The system of claim 1, wherein the historical data is not included in the data stream at a time after initializing the query.

7. The system of claim 1, wherein the historical data comprises business event data from the data stream at a time before initializing the query.

8. The system of claim 1, wherein evaluating the archived relation includes at least forming a query graph with nodes representing operators of the continuous query.

9. The system of claim 8, wherein at least one of the nodes identifies the window size.

10. The system of claim 8, wherein the one or more processors are further configured to execute the plurality of instructions to at least traverse the query graph topographically from a source.

11. The system of claim 10, wherein the one or more processors further execute the plurality of instructions to at least initialize the continuous query with at least the historical data at a lowest stateful operator identified in the query graph.

12. A computer-readable memory storing a plurality of instructions executable by one or more processors, the plurality of instructions comprising:
   instructions that cause the one or more processors to receive a continuous query configured to process archived relations, the continuous query including at least one of an identifier of the data stream or an identifier of historical data;
   instructions that cause the one or more processors to generate a query graph based at least in part on the continuous query;
   instructions that cause the one or more processors to receive a window size from an entity associated with the data stream;
   instructions that cause the one or more processors to generate an archived relation to include at least a portion of the historical data and incoming events of the data steam that are within a window that corresponds to the window size, the historical data from a previous time associated with the data stream;
   instructions that cause the one or more processors to initialize the continuous query with the archived relation to process at least the portion of the historical data based at least in part on the window size; and
   instructions that cause the one or more processors to evaluate the archived relation using the continuous query based at least in part on the historical data, the window size being based at least in part on the query graph.

13. The computer-readable memory of claim 12, wherein the archived relation is identified by a data definition language annotation of the continuous query.

14. The computer-readable memory of claim 13, wherein the data definition language annotation identifies at least one of a location of the historical data, a source of the archived relation, a data object associated with the archived relation, operation information associated with processing the continuous query, one or more relevant columns of a database corresponding to the historical data, a data object corresponding to output of the continuous query, or a location for providing the output of the continuous query.

15. The computer-readable memory of claim 12, wherein the plurality of instructions further comprise instructions that cause the one or more processors to determine an amount of historical data with which to initialize the continuous query based at least in part on the window size.

16. The computer-readable memory of claim 12, wherein the continuous query is initialized with the at least a portion of the historical data at a stateful operator of the query graph while traversing the query graph topographically from a source of the query graph.

17. A computer-implemented method, comprising:
receiving a continuous query configured to process archived relations associated with business event data, the continuous query including an identifier of historical data associated with the stream;
generating an archived relation to include at least a portion of the historical data and incoming events of the steam that are within a window that corresponds to the window size, the historical data from a previous time associated with the stream;
receiving a window size configured to identify a bounded range of the archived relation to-process;
generating a query graph based at least in part on the continuous query, the query graph including at least a node representing an operator of the continuous query;
traversing the query graph topographically from a source node of the query graph to identify a stateful operator;
initializing the continuous query with the archived relation to process at least the portion of the historical data at the identified stateful operator based at least in part on the window size; and
evaluating the archived relation using the continuous query based at least in part on the window size.

18. The computer-implemented method of 17, wherein the historical data includes business event data from a point in time of the archived relation prior to initializing the continuous query.

19. The computer-implemented method of 17, further comprising determining an optimal amount of the historical data with which to initialize the continuous query based at least in part on the operator of the continuous query.

20. The computer-implemented method of claim 17, further comprising determining an optimal amount of the historical data with which to initialize the continuous query based at least in part on the window size.

* * * * *